US009557567B2

(12) United States Patent
Hiraide

(10) Patent No.: US 9,557,567 B2
(45) Date of Patent: Jan. 31, 2017

(54) METHOD FOR MANUFACTURING LIGHT GUIDE DEVICE, LIGHT GUIDE DEVICE, AND VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/765,456

(22) PCT Filed: Feb. 5, 2014

(86) PCT No.: PCT/JP2014/000601
§ 371 (c)(1),
(2) Date: Aug. 3, 2015

(87) PCT Pub. No.: WO2014/129133
PCT Pub. Date: Aug. 28, 2014

(65) Prior Publication Data
US 2015/0378163 A1    Dec. 31, 2015

(30) Foreign Application Priority Data

Feb. 22, 2013    (JP) .................. 2013-032938

(51) Int. Cl.
*G02B 5/04*    (2006.01)
*G02B 27/01*    (2006.01)
(Continued)

(52) U.S. Cl.
CPC ....... *G02B 27/0172* (2013.01); *B32B 37/1284* (2013.01); *G02B 17/006* (2013.01);
(Continued)

(58) Field of Classification Search
CPC ..... G02B 27/0172; G02B 27/017; G02B 5/04; G02B 6/00; G02B 27/0178; G02B 27/014; G02B 6/0001; G02B 2027/0123; G02B 2027/0178
(Continued)

(56) References Cited

U.S. PATENT DOCUMENTS

| 5,912,769 A | 6/1999 | Iizuka et al. |
| 6,049,429 A | 4/2000 | Iizuka et al. |

(Continued)

FOREIGN PATENT DOCUMENTS

| JP | H09-73005 A | 3/1997 |
| JP | H10-268114 A | 10/1998 |

(Continued)

OTHER PUBLICATIONS

May 16, 2014 International Search Report issued in International Patent Application No. PCT/JP2014/000601.

*Primary Examiner* — Euncha Cherry
(74) *Attorney, Agent, or Firm* — Oliff PLC

(57) ABSTRACT

During the manufacturing of the light guide device (20), the first and second bonding ribs (R1,R2) are used such that the light guide prism (10) and the opposing prism (50) are connected with each other from a specific offset direction. In this case, a difference between sizes of clearances between the first bonding surface (AS) and the second bonding surface (BS) caused by a difference in inclination angles of the offset direction with respect to the first bonding surface is used such that a flow direction of the adhesive is controlled and filling is performed in a desire state, and thus high accuracy of the joint formed by the adhesive is maintained.

20 Claims, 14 Drawing Sheets

(51) Int. Cl.
  *B32B 37/12*   (2006.01)
  *G02B 17/00*   (2006.01)
  *G02B 17/04*   (2006.01)
  *G02B 27/10*   (2006.01)

(52) U.S. Cl.
  CPC .......... *G02B 17/04* (2013.01); *B32B 2551/00* (2013.01); *G02B 27/1073* (2013.01); *G02B 2027/011* (2013.01); *G02B 2027/013* (2013.01); *G02B 2027/0123* (2013.01); *G02B 2027/0178* (2013.01)

(58) Field of Classification Search
  USPC ................................ 359/630, 633, 833, 834
  See application file for complete search history.

(56) References Cited

U.S. PATENT DOCUMENTS

| | | | |
|---|---|---|---|
| 6,111,701 | A | 8/2000 | Brown |
| 7,826,113 | B2 * | 11/2010 | Noda .................... G02B 27/017 |
| | | | 359/13 |
| 2002/0030901 | A1 | 3/2002 | Kobayashi et al. |
| 2002/0105738 | A1 | 8/2002 | Kobayashi et al. |
| 2008/0239422 | A1 | 10/2008 | Noda |
| 2012/0200935 | A1 | 8/2012 | Miyao et al. |

FOREIGN PATENT DOCUMENTS

| | | |
|---|---|---|
| JP | H11-99525 A | 4/1999 |
| JP | H11-149003 A | 6/1999 |
| JP | 2006-276181 A | 10/2006 |
| JP | 2008-122508 A | 5/2008 |
| JP | 2012-163656 A | 8/2012 |

* cited by examiner (A)

(B) (C)

(D) (E)

(F)

METHOD FOR MANUFACTURING LIGHT GUIDE DEVICE, LIGHT GUIDE DEVICE, AND VIRTUAL IMAGE DISPLAY APPARATUS

TECHNICAL FIELD

The present invention relates to a method for manufacturing a light guide device that introduces image light so as to present an image formed by an image display element to an observer, and more particularly, a method for manufacturing a light guide device suitable for a head-mounted display mounted on a head portion of the observer, a light guide device, and a virtual image display apparatus using the light guide device.

BACKGROUND ART

Various optical systems have been proposed as an optical system assembled with a virtual image display apparatus such as a head-mounted display (hereinafter referred to as HMD) mounted on a head portion of an observer. Particularly, various prisms have been proposed as light guide prisms arranged in front of an eye (for example, refer to PTL 1, 2, and the like).

With regard to the virtual image display apparatus such as the HMD, it is desired to accelerate a reduction in size and weight and to achieve a wide angle of view without deteriorating image quality. Also, in a state where only image light is viewed with an entire field of vision of the observer being covered, the observer cannot determine a state of an outside world to be nervous. Meanwhile, with see-through view in which the outside world and the image are shown in an overlapped manner, various novel applications of virtual reality are generated. Accordingly, display expressing the image light overlapped without hindering the field of vision of the outside world is desired.

Allowing for the above-described situation, a light guide device is configured, for example, by a penetration-type prism arranged in a see-through manner in front of the eye of the observer with a plurality of free-form surfaces such that the observer can have a better feeling of mounting similar to a shape of glasses while a form of an appearance can be excellent. In a case of the light guide device applied to the virtual image display device with a see-through function, an inclined semi-transmissive surface is disposed on one end of a block-shaped light guide prism so as to overlap, for example, external light with the image light. In this case, in order to complement the inclination of the semi-transmissive surface and cover the front of the eye uniformly, another block-shaped light-transmitting member (opposing prism) that forms a pair is required to be bonded. During the bonding, acceptable see-through performance and image formation are not ensured if, for example, bubbles enter a bonding site and a distortion is generated on a reflection surface. Accordingly, it is important to appropriately control, for example, a flow direction of the adhesive during adhesion for the bonding and to have an excellent adhesive filling state.

CITATION LIST

Patent Literature

[PTL 1] JP-A-11-149003
[PTL 2] JP-A-10-268114

SUMMARY OF INVENTION

Technical Problem

However, in a case where the bonding site is formed to be a free-form surface, it is not always easy to control the adhesive to be filled in a desired state by applying the adhesive to be the joint to the free-form surface and bond the free-form surface.

Even in a case where the see-through function is not provided, the inclined reflective surface is disposed so as to, for example, take out the image light. In this case, there are appearance and strength problems, and there is a case where block-shaped members that form a pair are bonded at a site disposed on the reflective surface and, there is a concern over a distortion generated with respect to such reflective surface as in the case where the see-through function is provided.

Solution to Problem

An advantage of some aspects of the invention is to provide a method for manufacturing a light guide device that can be assembled with a virtual image display apparatus, which has a shape similar to a shape of glasses to have an excellent form of an appearance, has high manufacturing workability in a bonding part between the block-shaped light guide prism and the opposing prism, and allows an optical function to be ensured, the light guide device, and a virtual image display apparatus using the light guide device.

An aspect of the invention is directed to a method for manufacturing (a) a light guide device including (a1) a light guide prism that includes a mirror layer which performs reflection of image light propagated inward on a first bonding surface which is a light guide side bonding surface, (a2) an opposing prism that includes a second bonding surface which is arranged to oppose the first bonding surface and is a bonding surface on an opposite side corresponding to the first bonding surface, and is bonded with the light guide prism by bonding the first bonding surface and the second bonding surface with each other across the mirror layer, (a3) and a joint that is formed by an adhesive which is filled in an adhesion area between the first bonding surface and the second bonding surface, (b) the first bonding surface of the light guide prism being a free-form surface and (c) the second bonding surface of the opposing prism being a free-form surface having substantially the same shape as the first bonding surface, the method including (d) a preparing step in which the first bonding surface and the second bonding surface are caused to oppose each other, and the light guide prism and the opposing prism are arranged to be capable of approaching each other in a specific offset direction in which an inclination angle with respect to one end side of the first bonding surface and an inclination angle with respect to the other end side have the same orientation but different sizes; (e) an adhesive applying step in which the adhesive is applied to at least one surface of the first bonding surface and the second bonding surface that oppose each other in the preparing step; (f) an adhering step in which the second bonding surface and the first bonding surface are caused to approach each other in the offset direction such that the adhesive applied during the adhesive applying is interposed so as to be filled between the light guide prism and the opposing prism; and (g) a bonding step in which the adhesive that is filled between the first bonding surface and the second bonding surface during the adhering step is cured such that the joint which bonds the light guide prism and the opposing prism with each other is formed. Herein, the inclination angle of the offset direction with respect to the light guide side bonding surface means an angle formed by a directional vector showing the offset direction with respect to a plane defining the direction of the light guide side bonding surface at each point of the light guide side bonding surface, which is, for example, a tangent plane at the point. Also, the one inclination angle and the other inclination angle having the same orientation means that, for example, a sign of an inner product with regard to a normal vector of the plane specifying each inclination angle and the directional vector showing the offset direction is the same between the one inclination angle and the other inclination angle.

According to the method for manufacturing the light guide device, the light guide prism and the opposing prism are caused to approach each other from the specific offset direction and the first bonding surface and the second bonding surface are bonded with each other such that the light guide prism and the opposing prism are connected to each other. In this case, by using a difference in the inclination angle in the offset direction with respect to the first bonding surface, sizes of clearances (adhesion areas) formed between both of the surfaces during the adhesion can be different depending on positions on the first bonding surface even in a case where the first bonding surface and the second bonding surface which have the free-form surfaces unlikely to be aligned are adhered with each other. Because of the clearance difference, a filling process such as a flow direction of the adhesive can be controlled to be simple and a state where optical accuracy is high can be maintained while improving workability during the manufacturing of the joint by filling of the adhesive. In addition, the first bonding surface and the second bonding surface where the mirror layer which performs the reflection of the image light while forming the joint can be the free-form surfaces and the other surfaces that form the appearance such as the surfaces contributing to the light guiding can be the free-form surfaces such that an eye-front part of the light guide device can be close in shape to a shape of glasses and a form of the appearance is excellent.

In a specific aspect of the invention, in the method for manufacturing the light guide device described above, the first bonding surface of the light guide prism has a convex surface shape, the second bonding surface of the opposing prism has a concave surface shape, and the offset direction in the preparing step is a direction in which the inclination angle with respect to the one end side of the first bonding surface is smaller than the inclination angle with respect to the other end side. In this case, during the approach of the second bonding surface and the first bonding surface in the adhering, the clearance on the one end side of the first bonding surface can be narrower than the clearance on the other side in an earlier stage. In this manner, the filling process such as the flow direction of the adhesive can be controlled into a desired state.

In another specific aspect of the invention, in the method for manufacturing the light guide device described above, the adhesive in the adhesive applying step is applied to the one end side of the first bonding surface, and the adhesive in the adhering step is caused to flow from a side of the first bonding surface where the inclination angle with respect to the offset direction is small to a side where the inclination angle is large. In this case, the adhesive applied to the one end side of the first bonding surface can flow toward the other end side of the first bonding surface while performing the filling of the adhesive.

In still another specific aspect of the invention, in the method for manufacturing the light guide device described above, the light guide prism has a projection-shape first bonding rib, the opposing prism has a projection-shaped second bonding rib that corresponds to the first bonding rib, and, in the adhering step, the light guide prism and the opposing prism are adhered with each other through a sliding movement along the offset direction with the first bonding rib and the second bonding rib being references for holding. In this case, a relative positional relationship between the light guide prism and the opposing prism can be precise and a state where control accuracy of the flow of the adhesive in the adhering is high can be maintained by performing the adhesion by the sliding movement with the first and second bonding ribs being the references for holding.

In yet another specific aspect of the invention, in the method for manufacturing the light guide device described above, the light guide prism includes first and second faces that are arranged to oppose each other across the first bonding surface, and the free-form surface which introduces the image light from an image display element on an inner surface side while reflecting the light, and the light guide prism includes the first bonding rib in a state of being along at least a part of a lateral end portion disposed out of an area of the first bonding surface of the first and second faces. In this case, the first and second faces are shaped to include the free-form surfaces and the appearance and a mounting state of the virtual image display apparatus assembled with the light guide device are similar to glasses such that a curved surface shape along the face can be maintained with regard to the first and second faces forming the eye-front part and a part of the appearance while the guiding of the image light can be ensured and visibility can be approximately zero during observation of an outside world image in a case of see-through. Moreover, the first bonding rib is disposed along outer circumferences of the first and second faces such that an effect on the appearance of the first bonding rib of the assembled virtual image display apparatus can be suppressed.

In still yet another specific aspect of the invention, the method for manufacturing the light guide device described above further includes a molding step in which the light guide prism and the opposing prism are respectively formed by injection molding, in which, in the molding step, the first bonding rib and the second bonding rib are integrally formed in a state of being respectively along at least a part of the lateral end portion of the light guide prism and a lateral end portion of the opposing prism. In this case, the light guide prism and the opposing prism that respectively include the first bonding rib and the second bonding rib can be formed with relative simplicity and high accuracy.

In further another specific aspect of the invention, in the method for manufacturing the light guide device described above, the first and second bonding ribs respectively have first and second flat plate portions that extend along the lateral end portion, and the first and second flat plate portions are respectively disposed along a parting line of a molding die which performs the injection molding in the molding step to define the offset direction. In this case, the high-accuracy rib can be manufactured in a simple manner.

In still further another specific aspect of the invention, in the method for manufacturing the light guide device described above, in the adhering step, the light guide prism and the opposing prism are caused to approach and to be adhered with each other in a state where a surface of the first flat plate portion of the first bonding rib and a surface of the second flat plate portion of the second bonding rib are arranged on the same plane. In this case, for example, parallel directions on the same plane can be defined as the offset direction such that accurate adhesion and bonding processing can be performed.

In yet further specific aspect of the invention, in the method for manufacturing the light guide device described above, a shape of the free-form surface with regard to the first bonding surface of the light guide prism and the second bonding surface of the opposing prism is determined by performing a parameter adjustment according to control of a flow direction of the adhesive based on the following equation in which x, y, and z are coordinate values in polar coordinates, c is a curvature, $A_{n,m}$ is each coefficient parameter, and $r_0$ is a normalized aperture.

$$z(x, y) = \frac{c(x^2 + y^2)}{1 + \sqrt{1 - c^2(x^2 + y^2)}} + \sum_{n,m} A_{n,m}\left(\frac{x}{r_0}\right)^n\left(\frac{y}{r_0}\right)^m \qquad [\text{Math. 1}]$$

In this case, with respect to the flow direction of the adhesive, controlling to accelerate the flow in various directions can be more reliably performed and, for example, the controlling of the flow with regard to the direction other than the direction corresponding to the offset direction can be made.

In still yet further another specific aspect of the invention, in the method for manufacturing the light guide device described above, the light guide side bonding surface of the light guide prism and the opposing side bonding surface of the opposing prism are bonded with each other in a shape in which a thickness of an end portion of the adhesion area forming the joint on a side close to the observer is larger than a thickness of the end portion on a far side with respect to a differential between distances in which the joint is interposed. In this case, the joint that is formed can be unlikely to pose inconvenience to a field of vision even when the amount of the adhesive to be the joint is increased sufficiently to spread throughout an adhesion range in the bonding process since, of the part to be the joint, the width of the joint is increased for the observer and the side that is unlikely to be blurred is increased in size.

In a further specific aspect of the invention, in the method for manufacturing the light guide device described above, the light guide prism allows penetration of external light while guiding the image light, and the mirror layer of the light guide prism is a half mirror layer that performs partial reflection of the image light and partial passing of the external light. In this case, the image light and the external light can be observed at the same time via the half mirror layer.

In a still further specific aspect of the invention, in the method for manufacturing the light guide device described above, the opposing prism is an auxiliary prism that is bonded with and integrally fixed to the light guide prism and assists in a see-through function of the light guide prism. In this case, the field of vision of the outside world can be excellent via the light guide device.

The method for manufacturing the virtual image display apparatus uses the above-described method for manufacturing the light guide device, and thus a state where the accuracy of the joint is high can be maintained and the other surfaces that form the appearance such as the surfaces contributing to the light guiding can be the free-form surfaces such that the shape can be similar to a shape of glasses and the form of the appearance is excellent.

Another aspect of the invention is directed to a light guide device including (a) a light guide prism that includes a mirror layer which performs reflection of image light propagated inward on a first bonding surface which is a light guide side bonding surface, (b) an opposing prism that includes a second bonding surface which is arranged to oppose the first bonding surface and is a bonding surface on an opposite side corresponding to the first bonding surface, and is bonded with the light guide prism by bonding the first bonding surface and the second bonding surface with each other across the mirror layer, and (c) a joint that is formed by an adhesive which is filled in an adhesion area between the first bonding surface and the second bonding surface, in which (d) the first bonding surface of the light guide prism is a free-form surface, (e) the second bonding surface of the opposing prism is a free-form surface having substantially the same shape as the first bonding surface, (f) the light guide prism has a projection-shaped first bonding rib, (g) the opposing prism has a projection-shaped second bonding rib that corresponds to the first bonding rib, and (h) in the light guide prism and the opposing prism, the first bonding rib and the second bonding rib extend along a specific offset direction in which an inclination angle with respect to one end side of the first bonding surface and an inclination angle with respect to the other end side are different from each other.

During the manufacturing of the light guide device, the approach and bonding between first bonding surface and the second bonding surface along the specific offset direction in which the first bonding rib and the second bonding rib extend is facilitated. During the bonding, a difference in the inclination angle in the offset direction with respect to the first bonding surface is used such that sizes of the clearances (adhesion areas) which are formed between both of the surfaces during the adhesion can also be different depending on the positions on the first bonding surface. Accordingly, even in a case where the first bonding surface and the second bonding surface have the free-form surfaces that are unlikely to be aligned, a filling process such as a flow direction of the adhesive can be controlled such that the filling state in the joint formed from the adhesive can be excellent while a state where the accuracy is high can be maintained in the light guide device. In addition, the first bonding surface and the second bonding surface where the mirror layer which performs the reflection of the image light while forming the joint can be the free-form surfaces and the other surfaces that form the appearance such as the surfaces contributing to the light guiding can be the free-form surfaces such that an eye-front part of the light guide device can be close in shape to a shape of glasses and a form of the appearance is excellent.

In a specific aspect of the invention, in the light guide device described above, the first bonding rib and the second bonding rib are respectively integrally formed with the light guide prism and the opposing prism by injection molding in a state of respectively being along at least a part of a lateral end portion of the light guide prism and a lateral end portion of the opposing prism.

In another specific aspect of the invention, in the light guide device described above, the first and second bonding ribs respectively have first and second flat plate portions that extend along the lateral end portion, and the first and second flat plate portions are respectively disposed along a parting line of a molding die which performs the injection molding to define the offset direction.

In still another specific aspect of the invention, in the light guide device described above, a shape of the free-form surface with regard to the first bonding surface of the light guide prism and the second bonding surface of the opposing prism is determined by performing a parameter adjustment according to control of a flow direction of the adhesive based on the following equation in which x, y, and z are coordinate values in polar coordinates, c is a curvature, $A_{n,m}$ is each coefficient parameter, and $r_0$ is a normalized aperture.

$$z(x, y) = \frac{c(x^2 + y^2)}{1 + \sqrt{1 - c^2(x^2 + y^2)}} + \sum_{n,m} A_{n,m}\left(\frac{x}{r_0}\right)^n \left(\frac{y}{r_0}\right)^m \quad [\text{Math. 2}]$$

Still another aspect of the invention is directed to a first virtual image display apparatus including an image display element that generates image light, and a light guide device that introduces image light from the image display element on an inner surface side while reflecting the light.

The above-described virtual image display apparatus uses the above-described light guide device, and thus a state where the accuracy of the joint is high can be maintained and the other surfaces that form the appearance such as the surfaces contributing to the light guiding can be the free-form surfaces such that the shape can be similar to a shape of glasses and the form of the appearance is excellent.

Yet another aspect of the invention is directed to a second virtual image display apparatus (a) that allows an observer to recognize an image as a virtual image, including (b) an image display element that generates image light, (c) a light guide prism that allows the image to be recognized toward an eye of the observer, and (d) an opposing prism that includes a mirror layer that reflects light of the image from the light guide prism toward the observer, and constitutes a see-through portion with a bonding surface of the light guide prism across the mirror layer, in which (e) in the light guide prism, the bonding surface of the light guide prism is a free-form surface, (f) in the opposing prism, a bonding surface of the opposing prism is a free-form surface having substantially the same shape as the light guide side bonding surface, (g) the light guide prism has a projection-shaped first bonding rib, (h) the opposing prism has a projection-shaped second bonding rib that corresponds to the first bonding rib, and (i) in the light guide prism and the opposing prism, the first bonding rib and the second bonding rib extend along a specific offset direction in which an inclination angle with respect to one end side of the bonding surface of the light guide prism and an inclination angle with respect to the other end side are different from each other.

In the virtual image display apparatus, during the manufacturing of the light guide device, the approach and bonding between the bonding surface of the light guide prism and the bonding surface of the opposing prism along the specific offset direction in which the first bonding rib and the second bonding rib extend is facilitated such that the filling state in the joint formed from the adhesive can be excellent while a state where the accuracy is high can be maintained. Also, the other surfaces that form the appearance such as the surfaces contributing to the light guiding can be the free-form surfaces such that the shape can be similar to a shape of glasses and the form of the appearance is excellent.

Figure 2:
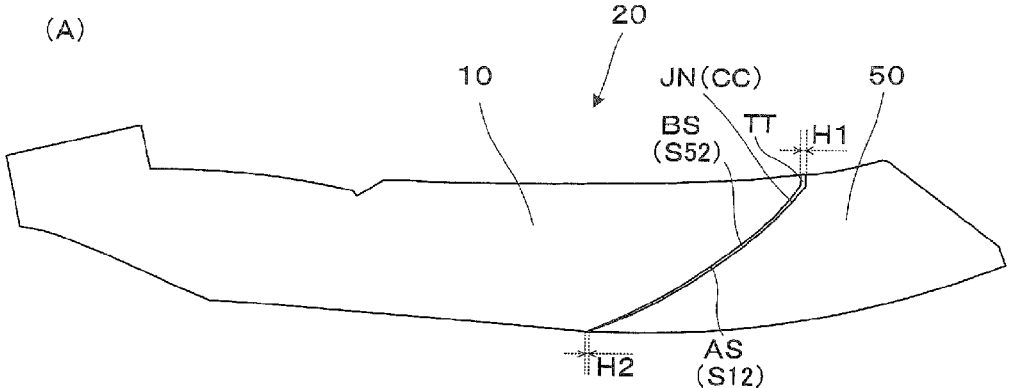
Figure 2:
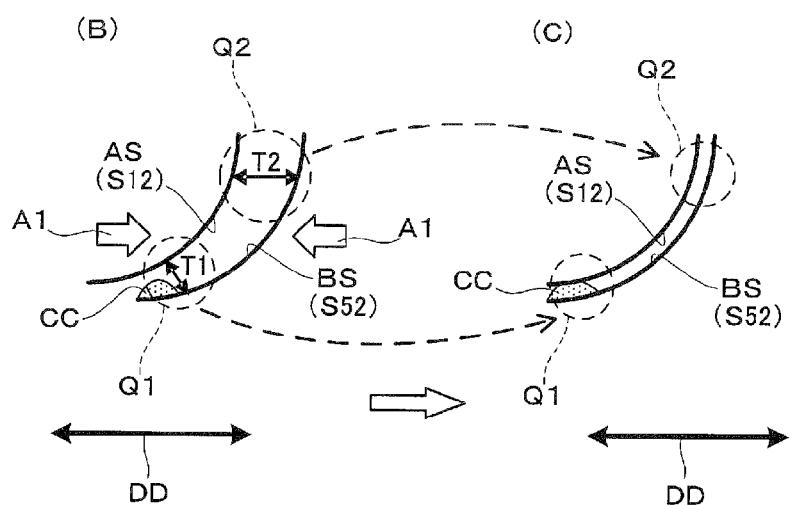
Figure 2:
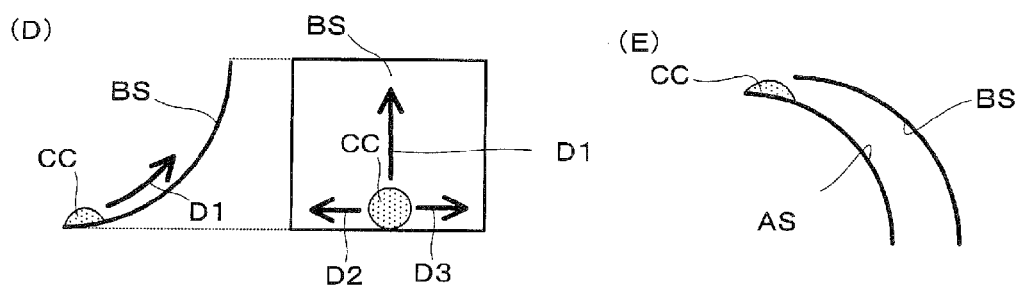
Figure 2:
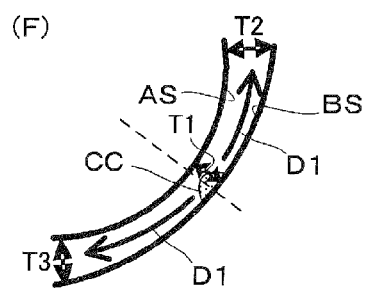

(A) in FIG. 2 is a view showing a state where a light guide prism and an opposing prism are bonded with each other, (B) and (C) are schematic views showing a clearance of a bonding site, (D) is a schematic view showing an extension direction of an adhesive, (E) is a schematic view showing a modification example of an adhesion method, and (F) is a schematic view showing a light guide device of a comparative example.

Figure 3:
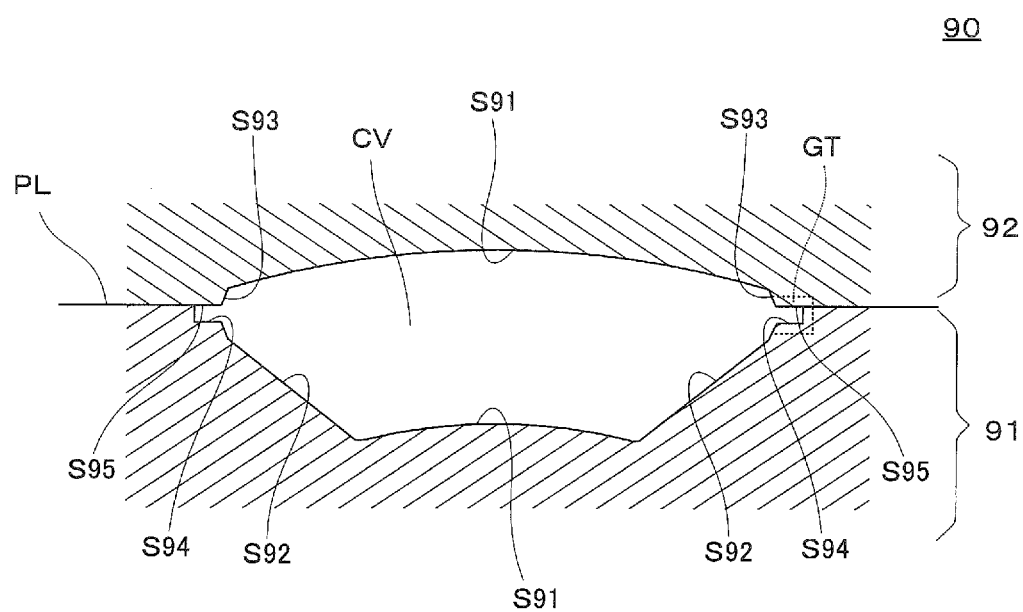

FIG. 3 is a side sectional view of a molding die illustrating prism molding by injection molding using the molding die.

Figure 4:
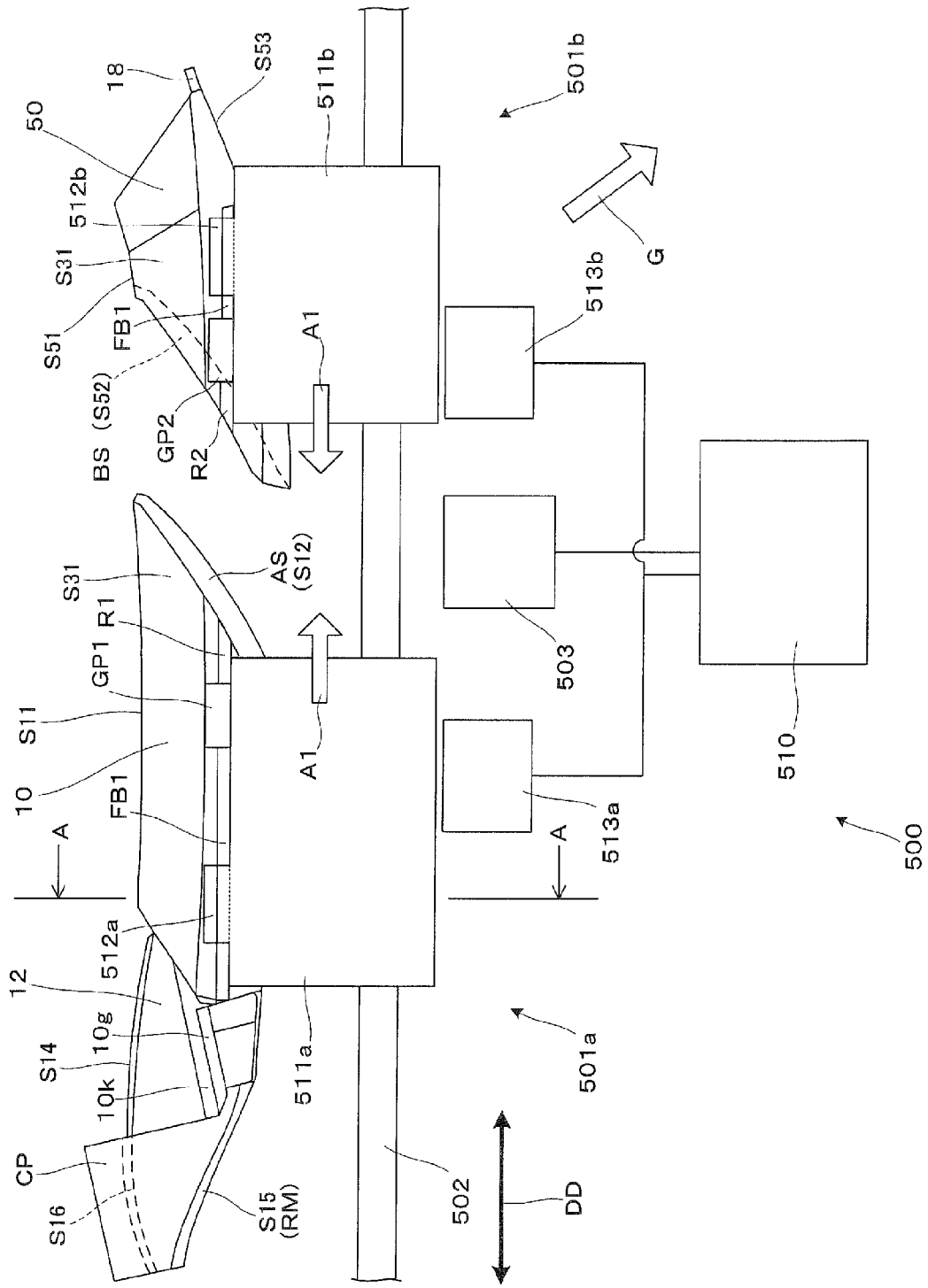

FIG. 4 is a side view illustrating the bonding between the light guide prism and the opposing prism.

Figure 5:
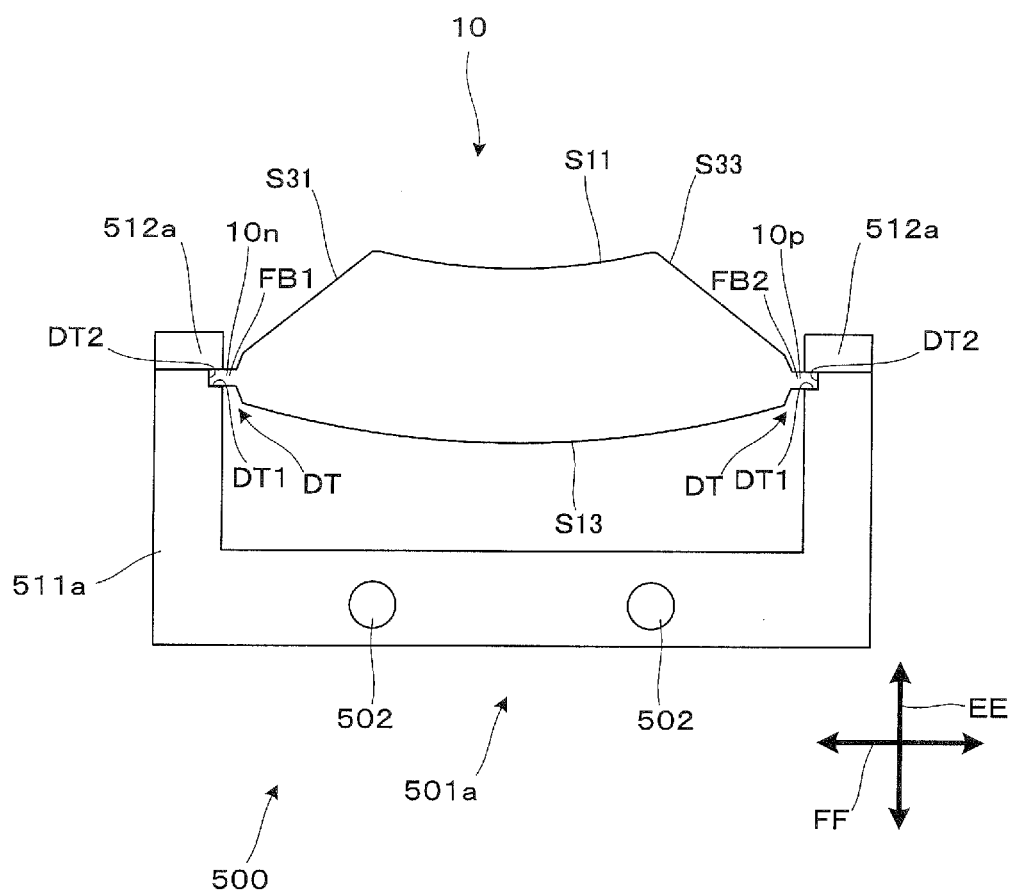

FIG. 5 is a cross-sectional view showing an installation state of the prism in FIG. 4.

Figure 6:
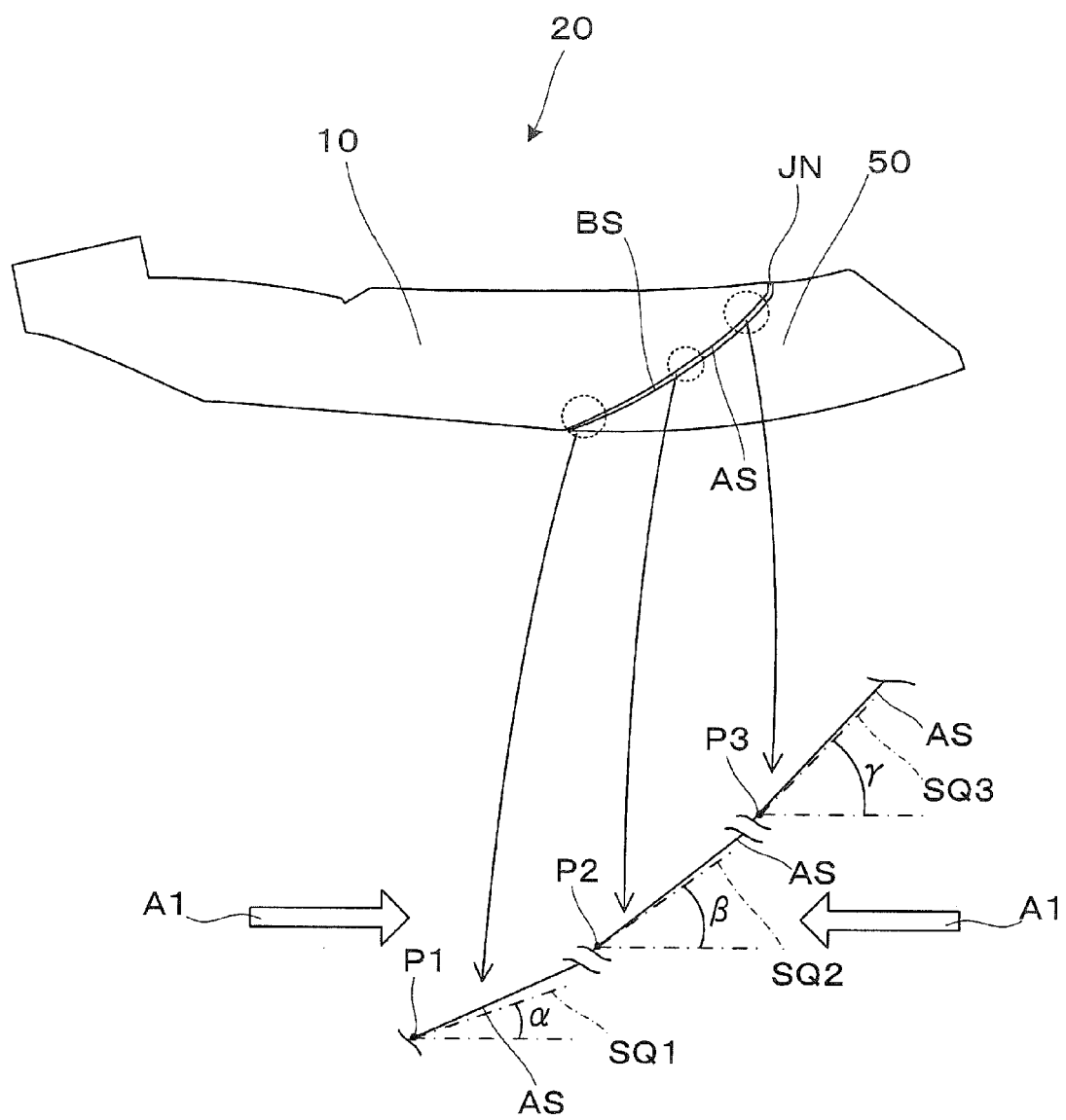

FIG. 6 is a view illustrating an inclination angle with respect to an offset direction of a first bonding surface of the light guide prism and a second bonding surface of the opposing prism.

Figure 7A:
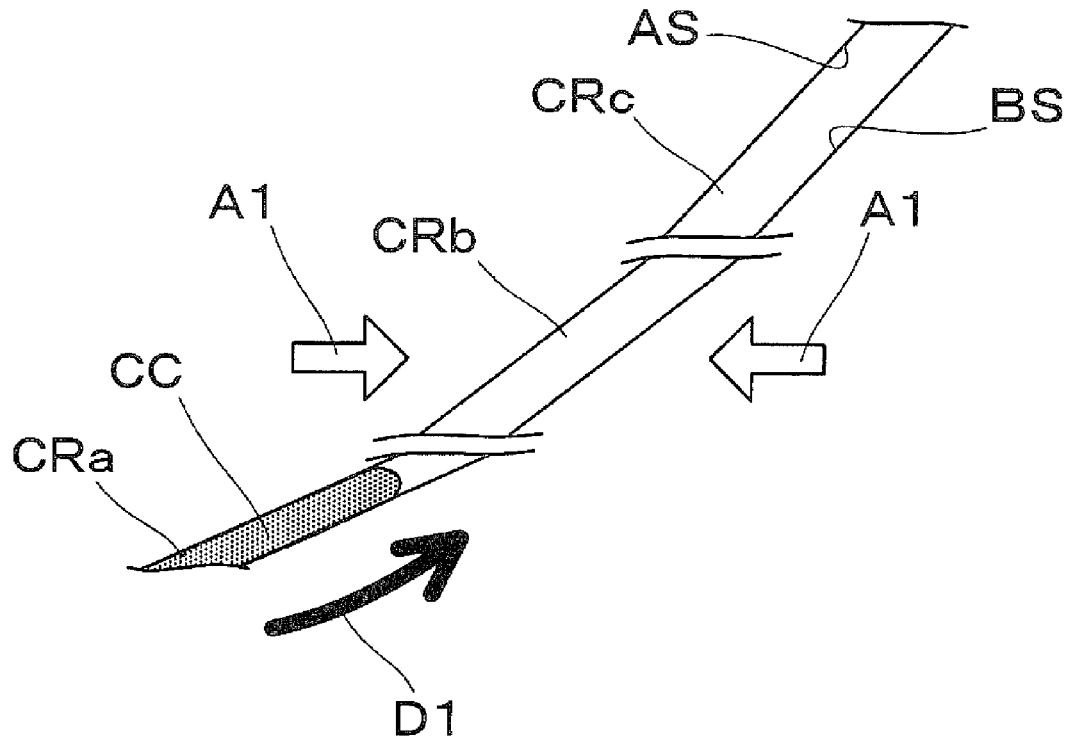

FIG. 7A is a view showing a condition of the adhesive in an early stage of adhesion.

Figure 7B:
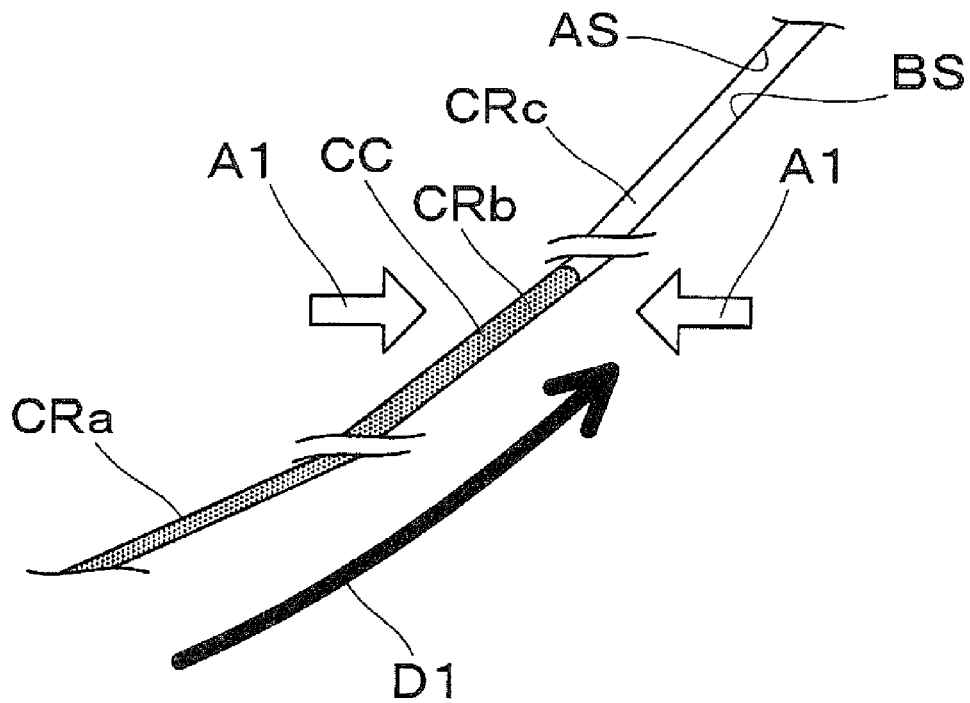

FIG. 7B is a view showing a condition of the adhesive in an intermediate stage of the adhesion.

Figure 7C:
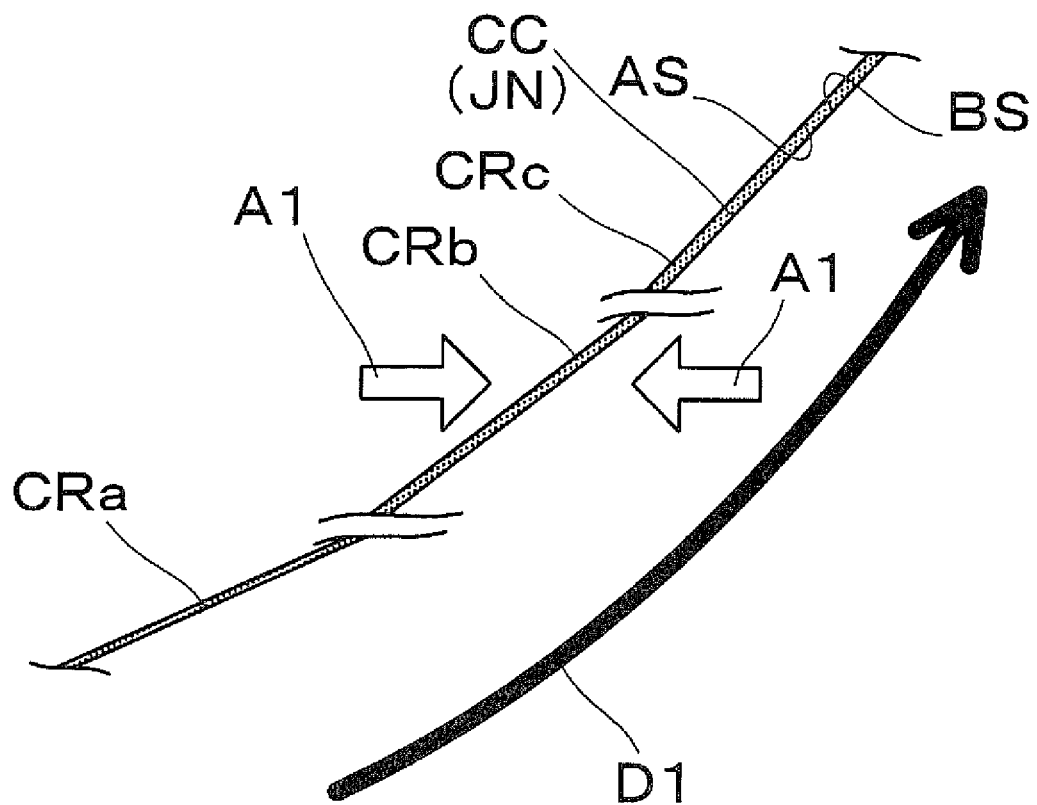

FIG. 7C is a view showing a condition of the adhesive in a final stage of the adhesion.

Figure 8:
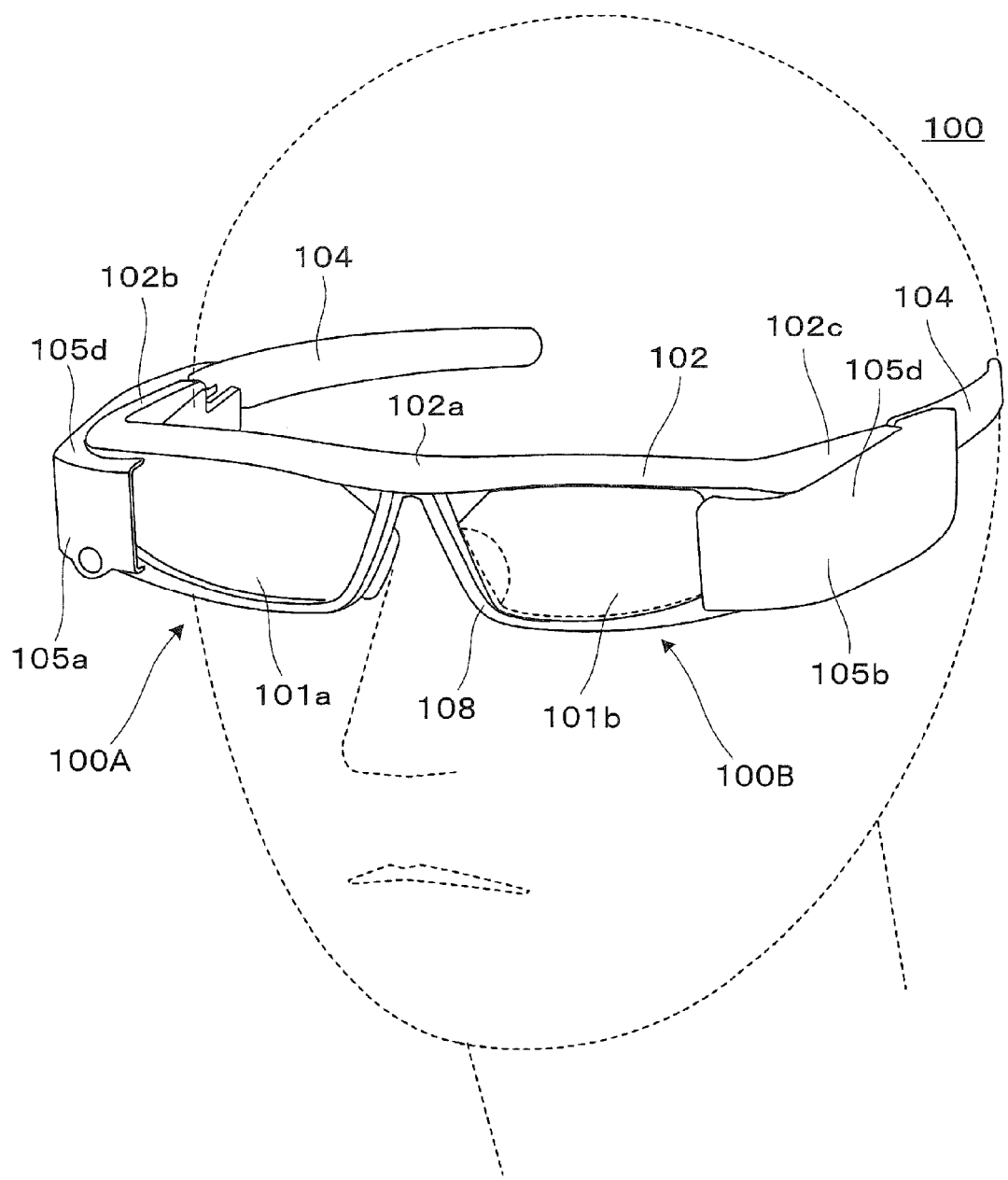

FIG. 8 is a perspective view illustrating an appearance of a virtual image display apparatus of a second embodiment incorporating the light guide device.

Figure 9A:
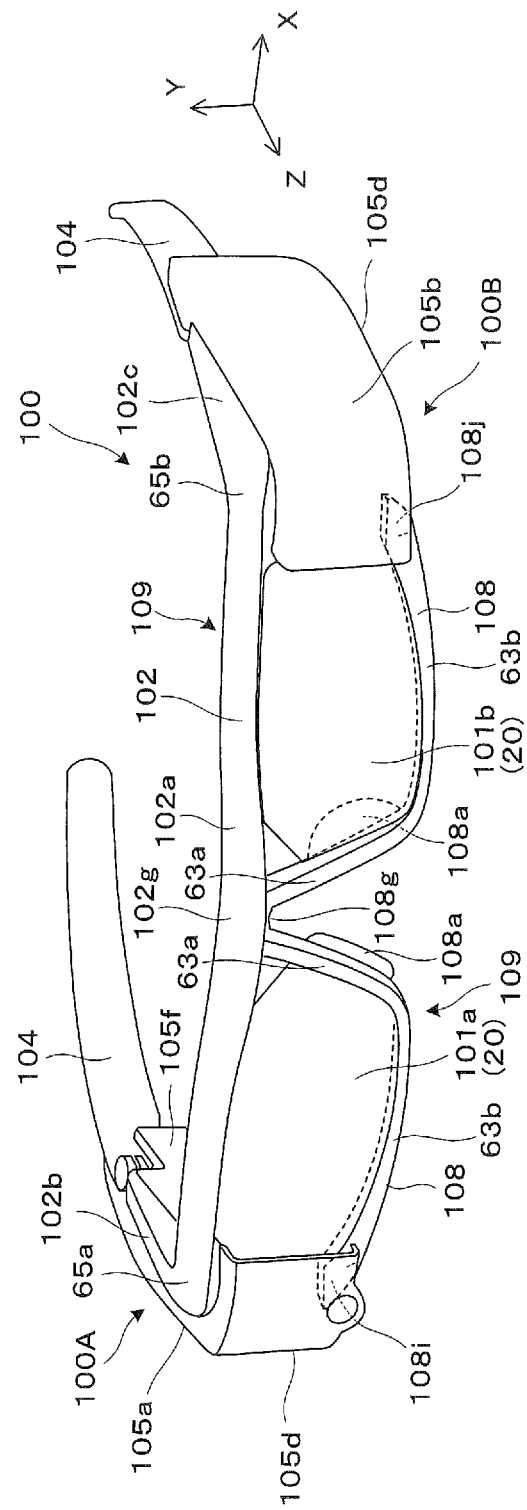

FIG. 9A is an overall perspective view showing the virtual image display apparatus.

Figure 9B:
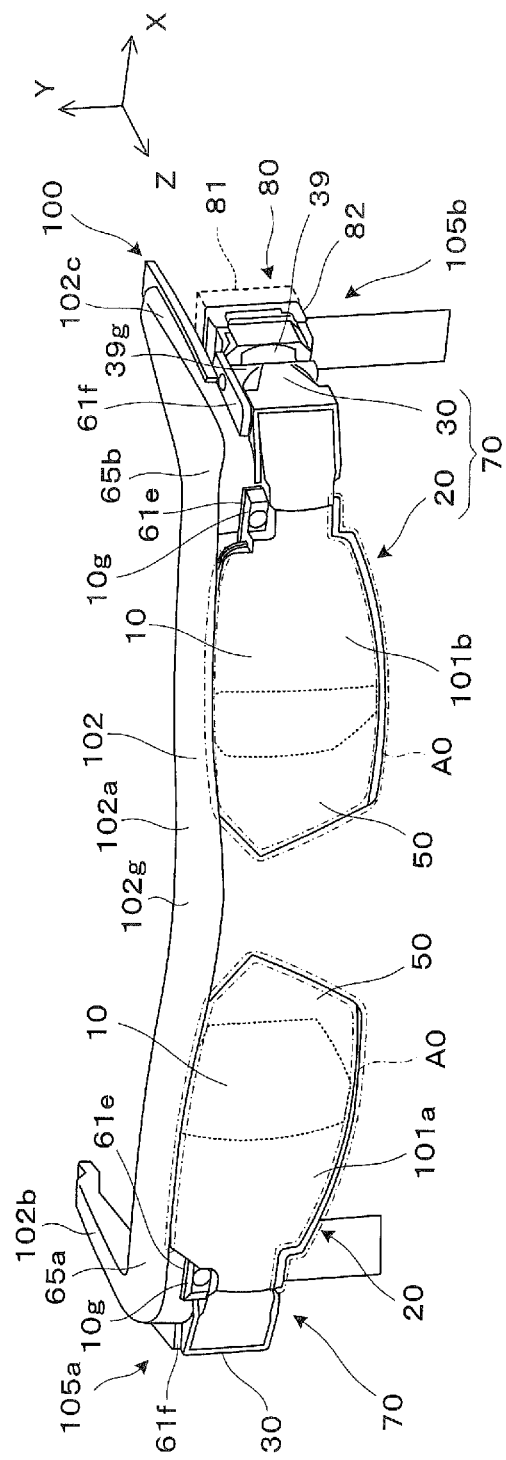

FIG. 9B is a perspective view showing an internal structure of the virtual image display apparatus from which an exterior member and a protector are removed.

Figure 10:
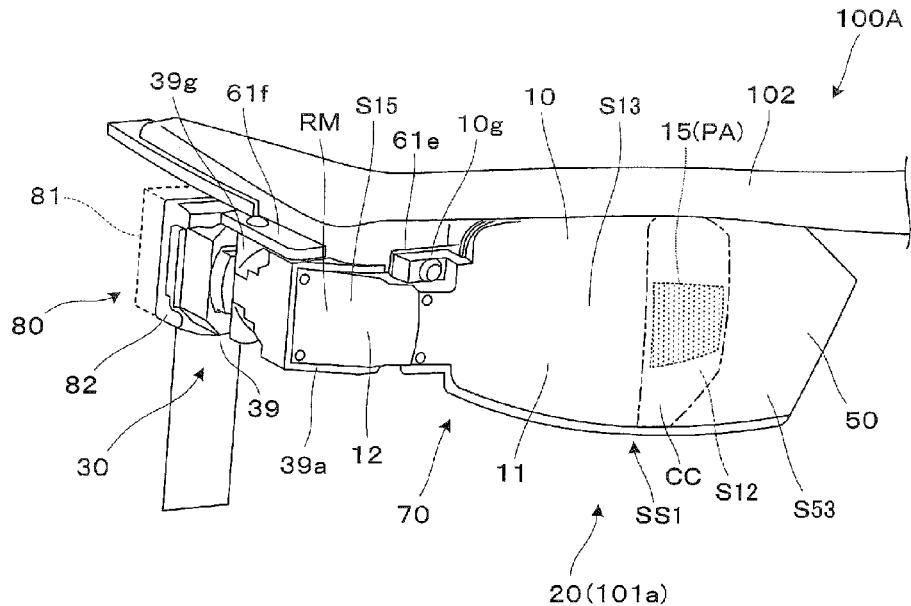

FIG. 10 is a perspective view showing a state where the exterior member is removed so as to illustrate a structure of a first display device of the virtual image display apparatus.

Figure 11A:
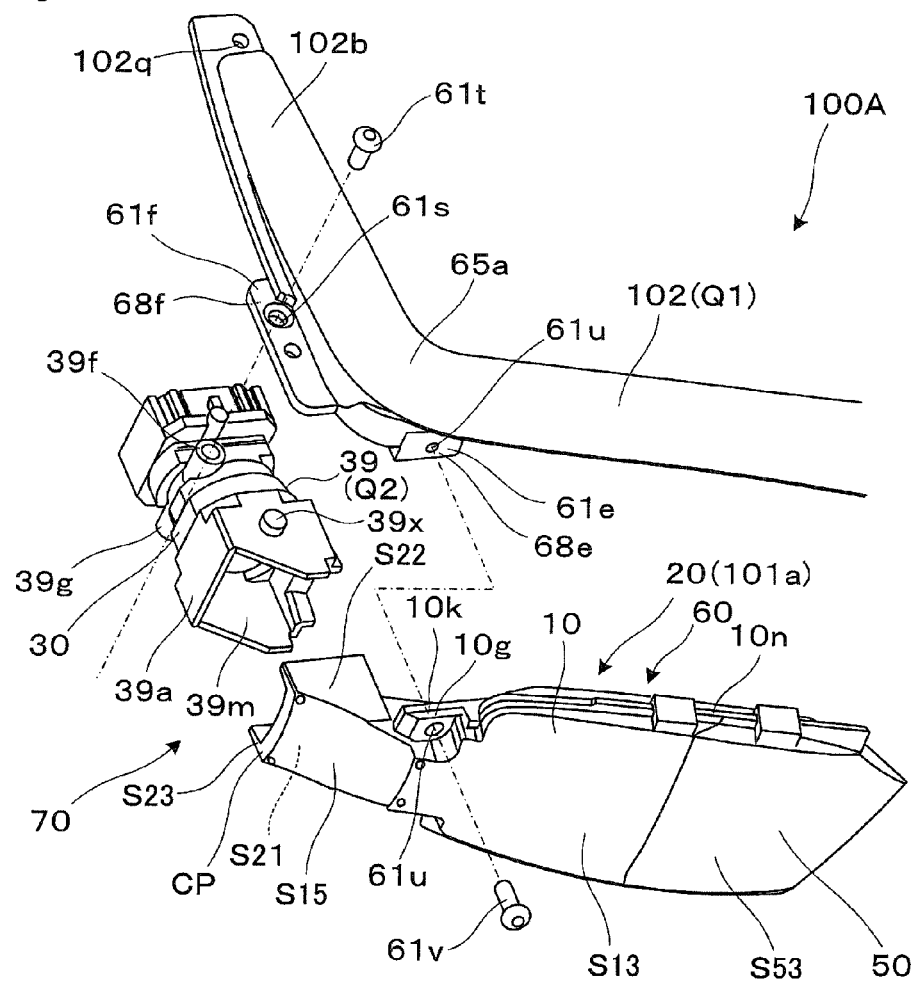

FIG. 11A is an exploded perspective view illustrating a method for fixing a prism and a projection lens of the virtual image display apparatus to a frame.

Figure 11B:
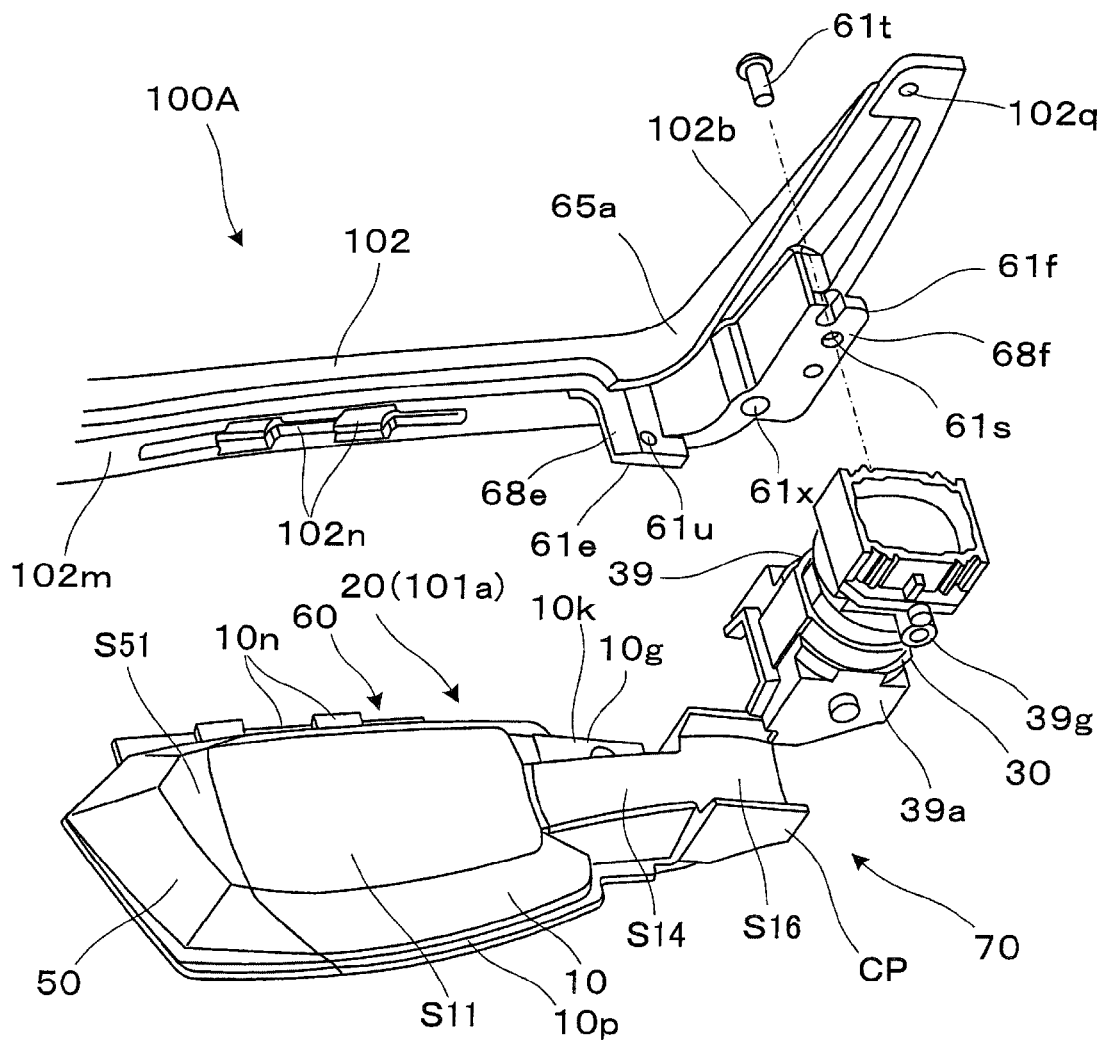

FIG. 11B is an exploded perspective view illustrating a method for fixing a prism and a projection lens of the virtual image display apparatus to a frame.

Figure 12:
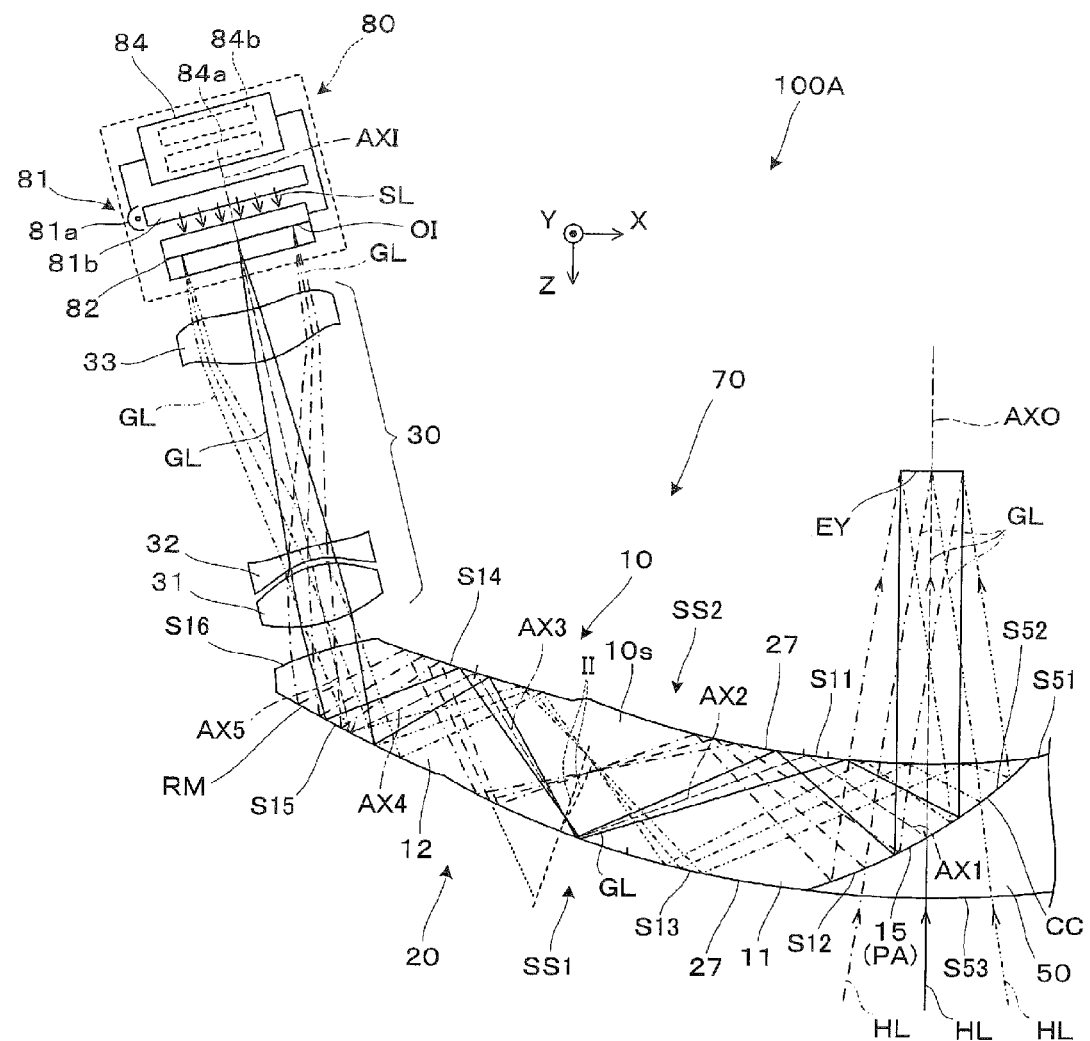

FIG. 12 is a cross-sectional view of a plane of symmetry with respect to a top and a bottom of the first display device constituting the virtual image display apparatus.

DESCRIPTION OF EMBODIMENTS

First Embodiment

Hereinafter, a light guide device and the like of a first embodiment according to the invention will be described in detail referring to the accompanying drawings.

Figure 1A:
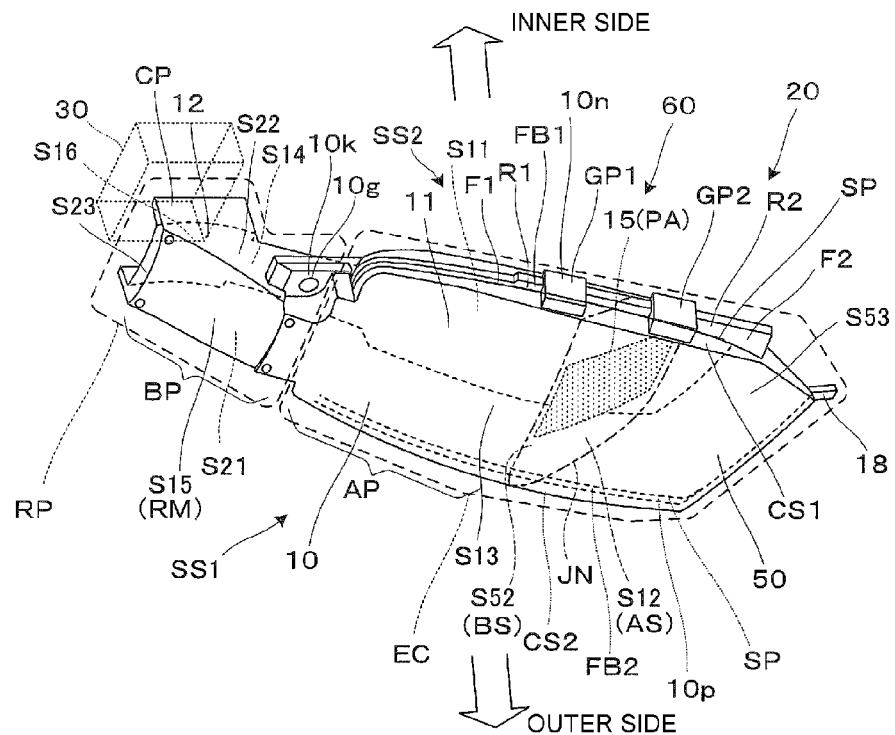
FIG. 1A is a perspective view illustrating an appearance and a structure of a light guide device of a first embodiment.
Figure 1B:
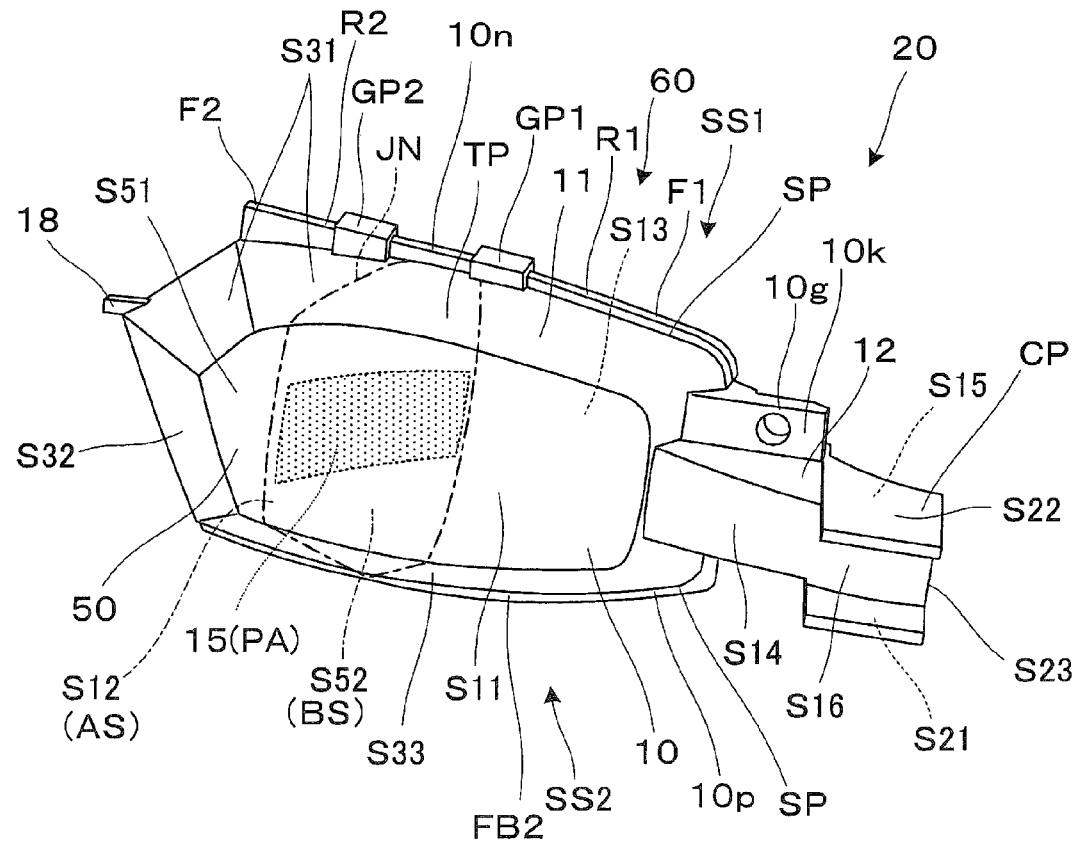
FIG. 1B is a perspective view of the light guide device viewed from another direction than in FIG. 1A.

A light guide device 20 shown in FIGS. 1A and 1B has a light guide prism 10 that is arranged on a projection lens 30 (refer to FIG. 1A) side, a projection lens 30 being another member associated with image formation or an image formation main body portion, and an opposing prism 50 that is a light transmitting member which is arranged on an opposite side from the projection lens 30 across the light guide prism 10, and is integrated by bonding the light guide prism 10 and the opposing prism 50 with each other. The light guide device 20 guides image light from the projection lens 30 by using the light guide prism 10, emits the light from an inner side where an eye or a face of a wearer is present, and transmits external light via the light guide prism 10 and the opposing prism 50 to the inner side where the eye of the wearer is present.

The light guide device 20 is a member formed of resin that has an intricately curved three-dimensional shape and, in terms of appearance, has an eye cover unit EC that is a drop-shaped and flat ellipsoid covering a front of the eye of the wearer, and a polyhedral root portion RP that extends in an elongated manner from the eye cover unit EC. The light guide device 20 has a first face SS1 on a front side far from the eye or the face of the wearer, that is, an outer side, and a second face SS2 on a back side close to the face of the wearer, that is, the inner side, which are surfaces fulfilling an optical function and covering the front of the eye to form the appearance.

A lateral end portion SP that forms a front-view outline of the light guide device 20 is disposed between the first face SS1 and the second face SS2, and a projecting rib 60 is disposed along a part of the lateral end portion SP. Although described in detail later, the rib 60 is disposed to correspond to top and bottom sides of the light guide device 20 viewed from the front and, particularly, a rib part on the top side is divided into a bonding rib 10n and a frame mounting rib 10k.

The light guide prism 10 of the light guide device 20 has an eye-front formation portion AP, a link portion BP, and a connection portion CP. The eye-front formation portion AP is a swelled part that covers the front of the eye as a part of the eye cover unit EC of the light guide prism 10, and forms a face part of the first face SS1 and the second face SS2 whose outline has an elliptical shape with the opposing prism 50. The link portion BP is disposed on a root portion RP side of the light guide prism 10, and has the frame mounting rib 10k that allows mounting onto a frame, which is another member, as a part of the rib 60. The connection portion CP is disposed on the root portion RP side, and is used to connect the light guide device 20 with the projection lens 30. In other words, the connection portion CP is a member that allows a relative alignment of the first and second faces SS1 and SS2 with respect to the projection lens 30, and is a fitting portion that allows a posture alignment through locking using fitting between these and the projection lens 30.

As described above, the opposing prism 50 of the light guide device 20 is bonded with the eye-front formation portion AP of the light guide prism 10 to form the elliptical eye cover unit EC. In other words, the opposing prism 50 has surfaces corresponding to surfaces to be the first face SS1 and the second face SS2 of the light guide prism 10 so as to form the first face SS1 and the second face SS2 in conjunction with the light guide prism 10.

Hereinafter, the light guide prism 10 of the light guide device 20, which is a part associated with the optical function of performing the guiding of the image light, will be described. The light guide prism 10 is a member that shows high optical transmission property in a visible range, is integrally formed by injection molding, and is formed of a thermoplastic resin material and, in terms of function, can be considered to be divided into a first prism part 11 on a light emission side more apart from a not-shown image display element, and a second prism part 12 on a light incident side closer to the not-shown image display element.

The first prism part 11 has a first surface S11, a second surface S12, and a third surface S13 as surfaces having the optical function, and the second prism part 12 has a fourth surface S14, a fifth surface S15, and a sixth surface S16 as surfaces having the optical function. The first surface S11 and the fourth surface S14 are adjacent to each other, and the third surface S13 and the fifth surface S15 are adjacent to each other. The second surface S12 is arranged between the first surface S11 and the third surface S13, and the sixth surface S16 is arranged between the fourth surface S14 and the fifth surface S15.

In the light guide prism 10, each of the first surface S11, the second surface S12, the third surface S13, the fourth surface S14, the fifth surface S15, and the sixth surface S16 is a free-form surface and is associated with imaging.

Hereinafter, an optical path of the light guiding by the light guide prism 10 will be described briefly. The image light from the projection lens 30, which is another member, is first incident on the sixth surface S16 of the second prism part 12 of the light guide prism 10, is reflected by the fifth surface S15, and is further reflected by the fourth surface S14. Then, the image light is incident on the third surface S13 of the first prism part 11 to be totally reflected, and is incident on the first surface S11 to be totally reflected. The image light that is totally reflected by the first surface S11 is incident on the second surface S12, is partially reflected, and is incident on the first surface S11 again to pass therethrough. Although described in detail later, the second surface S12 has a half mirror layer 15 as a mirror layer that realizes see-through, and reflects the image light while partially transmitting the image light. The image light that passes through the first surface S11 allows an observer to observe an image. The first surface S11 and the third surface S13 are arranged in front of an eye EY and are formed into a concave surface shape with respect to the observer, and visibility is approximately zero when the external light passing through the first surface S11 and the third surface S13 is seen. In other words, in the light guide prism 10, the third surface S13 and the like as the first face SS1 and the first surface S11 and the like as the second face SS2 opposing this are free-form surfaces, and thus the guiding of the image light is allowed and the external light can be transmitted such that the visibility is approximately zero.

Hereinafter, the opposing prism 50 of the light guide device 20 will be described. As described above, the opposing prism 50 constitutes the light guide device 20 that is a single optical component integrally fixed with the light guide prism 10, and is a prism (auxiliary prism) assisting in a see-through function of the light guide prism 10. The opposing prism 50 shows high optical transmission property in the visible range, and a main body part of the opposing prism 50 is formed of a thermoplastic resin material with substantially the same refractive index as the light guide prism 10.

The opposing prism 50 is a light transmitting member that has a first transmitting surface S51, a second transmitting surface S52, and a third transmitting surface S53 as side surfaces having the optical function. Herein, the second transmitting surface S52 is arranged between the first transmitting surface S51 and the third transmitting surface S53. The first transmitting surface S51 is on a curved surface that is extended from the first surface S11 of the light guide prism 10. From a different perspective, the first transmitting surface S51 and the first surface S11 form a face of the second face SS2 whose outline has an elliptical shape, particularly of the second face SS2, in front of the eye. The second transmitting surface S52 is a curved surface that is integrated by a joint JN which is formed by filling the second surface S12 with an adhesive. In other words, the second transmitting surface S52 and the second surface S12 of the light guide prism 10 are integrated with each other by bonding, and thus have shapes of substantially the same curvature. The third transmitting surface S53 is on a curved surface that is extended from the third surface S13 of the light guide prism 10. From a different perspective, the third transmitting surface S53 and the third surface S13 form a face of the first face SS1 whose outline has an elliptical shape, particularly of the first face SS1, in front of the eye. Also, in the above case, a state where the visibility is approximately zero when the passing external light is seen is maintained even for the first transmitting surface S51 and the second transmitting surface S52 that are respectively extended from the first surface S11 and the third surface S13. In other words, the external light can be transmitted such that the visibility is approximately zero in not only the light guide prism 10 but also the opposing prism 50 and a part where both of the prisms are overlapped and bonded with each other.

The opposing prism 50 has a rod-shaped dripping guide unit 18 on a tip side opposing the root portion RP side. After the opposing prism 50 is bonded to the light guide prism 10, a hard coat layer 27 is applied to a face with the light guide prism 10. In this case, during the film formation of the hard coat layer 27, the dripping guide unit 18 suppresses pooling of a coating solution to be the hard coat layer 27 and reduces a coating irregularity.

Herein, the second surface S12 of the light guide prism 10 that is a site of bonding with the opposing prism 50 has a configuration using a half mirror so as to realize the see-through view in which an outside world and the image are shown in an overlapped manner. Specifically, the second surface S12 is a face of the light guide prism 10, and the half mirror layer 15 is incidental to the face. The half mirror layer 15 is a light reflection film RM (that is, a semi-transmissive reflective film) that has optical transmission property. The half mirror layer (semi-transmissive reflective film) 15 is formed on a partial area PA that is a part of the second surface S12. The half mirror layer 15 is formed by forming a metal reflective film and a dielectric multilayer film, and a reflectance of the half mirror layer 15 with respect to an image light GL is from 10% to 50% in an assumed incident angle range of the image light GL from a viewpoint of facilitating a see-through observation with regard to the external light passing through the opposing prism 50. Specifically, the reflectance of the half mirror layer 15 of the embodiment with respect to the image light GL is set to be, for example, 20%, and a transmittance with respect to the image light GL is set to be, for example, 80%.

In the light guide prism 10, the second surface S12 is also a first bonding surface AS which is a surface bonded with the opposing prism 50 with the joint JN being interposed, that is, a light guide side bonding surface. Corresponding thereto, in the opposing prism 50, the second transmitting surface S52 is a second bonding surface BS which is a surface bonded with the light guide prism 10 with the joint JN being interposed, that is, an opposing side bonding surface. The first bonding surface AS and the second bonding surface BS are free-form surfaces, and are curved surfaces having substantially the same shape at the bonding site where these are bonded with each other.

In a case where the second surface S12 is considered as the first bonding surface AS and the second transmitting surface S52 is considered as the second bonding surface BS, an entire area of the second surface S12 and an entire area of the second transmitting surface S52 are equivalent to an adhesion surface during the bonding. In other words, the joint JN in a state where the light guide prism 10 and the opposing prism 50 are bonded with each other is formed and the light guide device 20 is formed when the adhesive is applied to an adhesion area on the adhesion surface to be filled between the light guide prism 10 and the opposing prism 50 and then the adhesive is cured. Details with respect to the bonding will be described in a manufacturing process.

Hereinafter, the rib 60 that is disposed over a substantially entire circumference of the light guide device 20 will be described. The rib 60 is a member formed of resin that is disposed as a part of and to be incidental to the light guide prism 10 and the opposing prism 50 and surrounds a circumferential edge of the light guide device 20. The rib 60 has the frame mounting rib 10k that has a mounting portion 10g which allows the mounting onto the frame, which is another member used to assemble a virtual image display apparatus, and bonding ribs 10n and 10p that are respectively formed on the top side and the bottom side to extend along the first face SS1 and the second face SS2 and are positioning references in bonding the light guide prism 10 and the opposing prism 50 with each other. Herein, the bonding rib on an upper end side is the bonding rib 10n and the bonding rib on a lower end side is the bonding rib 10p.

Of the above-described bonding ribs 10n and 10p, the bonding rib 10n on the upper end side has a flat-plated shaped flat plate portion FB1 (first flat plate portion). Similarly, the bonding rib 10p on the lower end side has a flat plate portion FB2 (second flat plate portion). When the flat plate portions FB1 and FB2 have planar parts having high accuracy, the bonding ribs 10n and 10p can be the positioning references during the bonding between the light guide prism 10 and the opposing prism 50. For example, the bonding rib 10n on the upper end side is configured to have a first bonding rib R1 that is incidental to the light guide prism 10 and a second bonding rib R2 that is incidental to the opposing prism 50. The light guide prism 10 and the opposing prism 50 are adhered to each other through a sliding movement along an offset direction DD with the first bonding rib R1 and the second bonding rib being references for holding. Herein, as described above, the rib 60, that is, the first and second bonding ribs R1 and R2 are arranged along the lateral end portion SP that is disposed out of an area of the first bonding surface AS. The bonding rib 10n on the upper end side that has the flat plate portion FB1 (first flat plate portion) is inserted into a groove-shaped limiting unit disposed in the frame as a stopper in a loose-fit state with a slight clearance during the mounting onto the above-described and not-shown frame, and thus functions to limit a relative displacement with respect to the frame. The bonding rib 10n on the upper end side has gate portions GP1 and GP2 that are formed to be incidental to the flat plate portion FB1. The gate portions GP1 and GP2 are equivalent to resin inlets that are used when the light guide prism 10 and the opposing prism 50 are respectively formed by injection molding.

In the frame mounting rib 10k, the mounting portion 10g is arranged outside the eye cover unit EC, and has a planar part that abuts against an abutting surface disposed in the frame and is a reference determining a relative posture during the mounting onto the above-described and not-shown frame.

As shown in FIG. 1B, not only the lateral end portion SP where the rib 60 is disposed but also a tapered surface TP that is formed to surround the entire first surface S11 which is a part of the second face SS2 is disposed between the first face SS1 and the second face SS2. The tapered surface TP is configured to have an inclined surface that forms an obtuse angle with respect to the first surface S11, and has an inclined side surface that extends along a part of the face of the wearer in wearing. In this manner, the light guide device 20 can have an optical design to be closer to the eye of the wearer. More specifically, the tapered surface TP has three flat surface parts S31, S32, and S33 as the inclined side surface, each of which corresponds to an eye socket edge, a cheek, and a nose.

As shown in FIG. 1A, the light guide device 20 has a connection surface CS1 between the first face SS1 and the flat plate portion FB1, and a connection surface CS2 between the first face SS1 and the flat plate portion FB1. The connection surfaces CS1 and CS2 are surfaces respectively inclined with respect to surfaces vertical to the flat plate portions FB1 and FB2. For example, by having the connection surfaces CS1 and CS2 inclined a few degrees with respect to the surfaces vertical to the flat plate portions FB1 and FB2, a cut taper can be provided during the molding and transfer accuracy of the first and second faces SS1 and SS2 can be increased.

As described above, the light guide device 20 is formed to have a number of free-form surfaces and, particularly, the second surface S12 of the light guide prism 10 that is the bonding site, that is, the first bonding surface AS, and the second transmitting surface S52 of the opposing prism 50 that has substantially the same shape corresponding thereto, that is, the second bonding surface BS are also free-form surfaces. Accordingly, in manufacturing of the light guide device 20, it is important to ensure a state where accuracy is high at the bonding site even for the bonding of such free-form surfaces and appropriately control the adhesive to be the joint JN during the assembly without causing bubbles to remain for the filling in a desired state. In this embodiment, particularly in a process of bonding the light guide prism 10 with the opposing prism 50 in manufacturing the light guide device 20, workability of the bonding is increased and it is allowed for each of the members to ensure the optical function.

FIG. 2(A) is a side sectional view of the light guide device 20 in a state where the light guide prism 10 and the opposing prism 50 are bonded with each other. (B) and (C) in FIG. 2 are schematic views illustrating an overview with regard to a state of a clearance of the bonding site during a bonding process in manufacturing the light guide device 20. In this embodiment, as shown in (B) and (C) in FIG. 2, the light guide prism 10 and the opposing prism 50 approach each other from a direction shown with an arrow A1 to be adhered and bonded with each other during the manufacturing of the light guide device 20. Hereinafter, the direction shown with the arrow A1 is the specific offset direction DD. Herein, a posture (inclination) of the first bonding surface AS and the posture (inclination) of the second bonding surface BS are adjusted to be in a substantially exactly overlapping state in a case where the sliding movement in the offset direction DD is continued. In the case of the adhesion through the approach from the offset direction DD, a difference can be made with regard to a distance between the first bonding surface AS and the second bonding surface BS, that is, the clearance between the two, as shown in an area Q1 on a lower side and an area Q2 on an upper side of (B) and (C) in FIG. 2. As shown in the drawings, when the first bonding surface AS that is positioned relatively on a left side is a convex surface looking upward to the right, the second bonding surface BS that is positioned relatively on a right side is a concave surface looking upward to the right, the first bonding surface AS is the upper side, and the second bonding surface BS is the lower side, with regard to the clearance, a distance T1 that shows a size of the clearance in the area Q1 is shorter than a distance T2 in the area Q2 as shown in FIG. 2(B). Accordingly, during a process of causing the light guide prism 10 and the opposing prism 50 to approach each other in the offset direction DD shown with the arrow A1 which is a lateral direction (left-right direction) to put these into a state shown in FIG. 2(C), the clearance on the area Q1 side positioned on the lower side is narrower in an early stage than on the area Q2 side positioned on the upper side. The first bonding surface AS and the second bonding surface BS have substantially the same shape and, when these approach each other, these finally have the postures substantially overlapping with each other, and thus the clearance difference can be substantially removed if an area of the adhesion area, that is, the joint is zero. However, during the process of the above-described approach, ways of narrowing the clearance are different depending on positions for relationship with the offset direction DD and a difference in the sizes of the clearances is made. According to a method for manufacturing the light guide device of this embodiment, the difference in the ways of narrowing the clearance is used such that an adhesive CC that is applied to a central side on the lower end side on the second bonding surface BS can be controlled to flow mainly in a direction D1 directed from the lower end side to the upper end side shown with an arrow within a surface of the second bonding surface BS (or the first bonding surface AS) and also in a direction D2 and a direction D3 as shown in, for example, FIG. 2(D). In the above-described manner, during the bonding between the light guide prism 10 and the opposing prism 50, the adhesive CC can be completely filled between the first bonding surface AS and the second bonding surface BS such that the bonding can be made with high accuracy.

In the case shown in FIG. 2(A), a width H1 of an end portion of the joint JN on a side close to the eye of the observer is larger than a width H2 of an end portion on a far side. This is because the side close to the eye is likely to be blurred for the observer and is comparatively unlikely to be noticed even when a width of the joint JN is relatively increased. In this case, during the bonding process, that is, the process of forming the joint JN, the joint JN that is formed can be unlikely to pose inconvenience to a field of vision even when the amount of the adhesive to be the joint JN is increased sufficiently to spread throughout an adhesion range. In addition, a positioning part TT is formed on an end portion side of the joint JN that is close to the eye. The positioning part TT is a part that is formed by slightly bending upper end side end portions of the first bonding surface AS and the second bonding surface BS, and prevents a misregistration from occurring by pressing the light guide prism 10 and the opposing prism 50 to each other during the bonding. In a case where there is no concern over the misregistration during the bonding, the positioning part TT, that is, the bent part of the first bonding surface AS and the like may not be disposed.

During the bonding between the light guide prism 10 and the opposing prism 50, a curvature of the second bonding surface BS with respect to a curvature of the first bonding surface AS is adjusted if necessary such that an adjustment of the difference in the sizes of the clearances between the light guide prism 10 and the opposing prism 50 is considered. Specifically, first, a shape of the first bonding surface AS that is the free-form surface and a surface equivalent to the second surface S12 which is an optical function surface for the light guiding is expressed by the following formula (1).

Herein, x, y, and z are coordinate values in polar coordinates, c is the curvature, $A_{n,m}$ is each coefficient parameter, and $r_0$ is a normalized aperture.

With respect thereto, a flow direction of the adhesive CC can be controlled by adjusting, for example, the c and the $A_{n,m}$ that is the parameter in the above formula as necessary and defining the shape of the second bonding surface BS. By performing the adjustment, controlling to accelerate the flow can be further reliably performed in not only the direction D1 corresponding to the offset direction DD but also the directions of the direction D2 and the direction D3 with respect to the flow direction of the adhesive CC shown in, for example, FIG. 2(D).

With regard to a positional relationship between the first bonding surface AS and the second bonding surface BS, the first bonding surface AS is the upper side of the drawing and the second bonding surface BS is the lower side as described above and later description will be made on the assumption of this relationship but, as in the case of, for example, a modification example shown in FIG. 2(E), the first bonding surface AS can be the lower side and the second bonding surface BS can be the upper side with both thereof being arranged to look upward to the left. In addition, in this case, the adhesive CC may be applied to the upper end side of the first bonding surface AS.

In addition, with regard to a method for manufacturing the joint JN, that is, a way of making the clearance, another aspect is also considered. As an example, as with a comparative example shown in FIG. 2(F), not using the clearance difference caused by the adhesion from the offset direction is also considered by making the difference in the clearances depending on the positions by only changing the curvature of the second bonding surface BS with respect to the curvature of the first bonding surface AS during the bonding between the light guide prism 10 and the opposing prism 50. Specifically, in the formula (1) above, it is also considered that a shape of the free-form surface that is re-calculated by slightly decreasing, for example, a value of the curvature shown with the c in the formula is expressed as the shape of the curved surface of the second bonding surface BS which is a surface corresponding to the first bonding surface AS such that the curvature of the second bonding surface BS with respect to the curvature of the first bonding surface AS is changed and a desired clearance is formed. In other words, as shown in FIG. 2(F), it is considered that the clearance is increased away from a minimum clearance position MP with the minimum clearance position MP shown with a dashed line being a reference, that is, the distance T2 and the distance T3 that are distances of the clearance at positions apart from the minimum clearance position MP are increased with respect to the distance T1 of the clearance at the minimum clearance position MP. However, in a case where such design is performed, arithmetic processing to define the free-form surface as described above is necessary for the first bonding surface AS and the second bonding surface BS so as to obtain a shape with which the adhesive CC is controlled into a desired state, that is, there is a case where the shape of the free-form surface needs to be designed for substantially each of the surfaces. With respect thereto, in this embodiment, the first bonding surface AS and the second bonding surface BS have substantially the same shape in principle, and the shapes can be defined with regard to both of the first bonding surface AS and the second bonding surface BS if the calculation to determine the free-form surface is performed on the second surface S12 which is the optical function surface, and thus the light guide prism 10 and the opposing prism 50 can be manufactured in a simpler manner compared to the case shown in FIG. 2(F). In addition, even in the bonding, the flow is expanded from the minimum clearance position MP in the case shown in FIG. 2(F), but there is a possibility of further complexity as the flow direction includes not only the main direction D1 directed, for example, from the lower end side to the upper end side but also, reversely, a direction directed from the lower end side to the upper end side and the like. With respect thereto, in this embodiment, the flow of the adhesive CC is simplified and the filling can be more reliably performed.

Hereinafter, the method for manufacturing the light guide device 20 according to this embodiment will be described in detail referring to FIGS. 3 and 4. As described above, in this embodiment, a process of preparing the light guide prism 10 and the opposing prism 50 during the manufacturing process and a process until completing the bonding therebetween are particularly important. Accordingly, hereinafter, a process from the molding of each of the prisms 10 and 50 to the forming of the joint will be described.

First, referring to FIG. 3, the molding (molding process) of each of the prisms by injection molding using a molding die in the process of manufacturing the light guide device 20 will be described. Herein, as an example, the molding of the light guide prism 10 that constitutes the light guide device 20 will be described. The description is similar with regard to the opposing prism 50, and thus illustration and description will be omitted.

As shown in FIG. 3, a molding die 90 that is used to mold the light guide prism 10 is configured to have a first die 91 and a second die 92, and the light guide prism 10 can be molded by sandwiching the first die 91 and the second die 92 and clamping both of the dies 91 and 92. In other words, molten resin flows from a gate GT that is a resin inlet into a cavity CV with respect to the molding die 90 in which the cavity CV which is an inner space in the clamped state is formed, and a suitable operation such as heating, cooling, pressing, and depressurization is performed such that the light guide prism 10 which has each of the curved surfaces such as the above-described free-form surface is formed (molding process). Herein, as shown in the drawing, the molding die 90 has transfer surfaces tailored to the surfaces. Specifically, in the first and second dies 91 and 92, the transfer surfaces S91 that are free-form surfaces which are formed to oppose each other correspond to the first surface S11, third surface S13 (refer to FIG. 1A and the like), and the like contributing to the light guiding. In addition, the transfer surfaces S92 correspond to the tapered surface TP that has the flat surface parts S31, S32, S33, and the like. Also, the transfer surfaces S93 correspond to the connection surfaces CS1 and CS2, and the transfer surfaces S94 and S95 correspond to the flat plate portions FB1 and FB2, that is, the faces of the bonding ribs 10*n* and 10*p*. In other words, the rib 60 that has the first bonding rib R1 and the like is also integrally formed. What remain after cutting in a part of the gate GT are gate portions GP1 and GP2.

Herein, as shown in the drawing, of the transfer surfaces S94 and S95 that correspond to the flat plate portions FB1 and FB2 (first and second flat plate portions), the transfer surface 95 is along a parting line PL of the molding die 90, and the transfer surface S94 is along the parting line PL in a parallel manner. In other words, the flat plate portions FB1 and FB2 are disposed along the parting line PL. In this case, accuracy of planar parts of the faces of the flat plate portions FB1 and FB2 can have the same degree of accuracy as the optical function surface. Accordingly, the bonding ribs 10*n* and 10*p* of the rib 60 can have simplicity and high accuracy, and can be used as reference surfaces during the bonding between the light guide prism 10 and the opposing prism 50.

Hereinafter, the bonding between the light guide prism 10 and the opposing prism 50 will be described in detail referring to FIG. 4 and the like. Herein, as an example, the bonding is performed by using a mounting device 500. FIG. 5 is a cross-sectional view taken along line A-A of FIG. 4.

First, a structure of the mounting device 500 that is used to bond the light guide prism 10 and the opposing prism 50 with each other will be described. As shown in FIGS. 4 and 5, the mounting device 500 has a first moving mechanism 501*a* that is used to move the light guide prism 10 in a fixed posture, a second moving mechanism 501*b* that is used to move the opposing prism 50 in a fixed posture, a pair of communication shaft portions 502, a position sensor 503 that confirms the relative positional relationship between the light guide prism 10 and the opposing prism 50, and a control unit 510 that performs controlling on each of the portions.

Herein, an extension direction of the pair of communication shaft portions 502 corresponds to the offset direction DD, that is, the pair of communication shaft portions 502 allow the sliding movement along the offset direction DD. Also, herein, considering that the adhesive CC is applied onto the second bonding surface BS, it is preferable that flow of the adhesive CC into an unintended direction due to gravity be suppressed to the maximum extent possible. Accordingly, as shown in the drawing, the first bonding surface AS (or the second bonding surface BS) is in a state close to horizontal as much as possible with respect to an exemplified gravity direction G or a part to which the adhesive CC is applied is on a slightly upper side with regard to the gravity direction G than the other parts.

The first moving mechanism 501*a* has a main body portion 511*a*, fixing tools 512*a*, and a drive device 513*a*. The main body portion 511*a* fixes the posture of the light guide prism 10 in conjunction with the fixing tools 512*a*, and is inserted by the communication shaft portions 502 such that the sliding movement is allowed. As shown in FIG. 5, the fixing tools 512*a* are a pair of members that are disposed to correspond to a pair of alignment groove portions DT which are disposed in the main body portion 511*a*. The first moving mechanism 501*a* places the flat plate portions FB1 and FB2, that is, the bonding ribs 10*n* and 10*p* of the light guide prism 10 on the groove portions DT of the main body portion 511*a*, places the fixing tools 512*a* from thereabove, and fixes the fixing tools 512*a* with respect to the main body portion 511*a* through, for example, screwing and pinning or adsorption (not shown) by suction or the like such that each of the surfaces of the flat plate portions FB1 and FB2 of the bonding ribs 10*n* and 10*p* are aligned in a state of being pressed against and pinched by the groove portions DT. Specifically, the alignment is made in a direction from the first surface S11 to the third surface S13 of the light guide prism 10, that is, a direction EE shown with an arrow in the drawing by a planar part DT1 of the groove portion DT and the fixing tool 512*a*, and the alignment is made in a direction from the flat plate portion FB1 to the flat plate portion FB2 of the light guide prism 10, that is, a direction FF shown with an arrow in the drawing by a planar part DT2. In other words, the light guide prism 10 is fixed in a state of being aligned to the main body portion 511*a* with a desired posture. The drive device 513*a* is configured to have a motor or the like, and causes the main body portion 511*a* to be slidingly moved along the communication shaft portions 502 in the arrow A1 direction according to a command from the control unit 510, that is, causes the light guide prism 10 to be slidingly moved along the offset direction DD.

The second moving mechanism 501*b* has a similar function as the first moving mechanism 501*a*, and has a main body portion 511*b*, fixing tools 512*b*, and a drive device 513*b*. in other words, as is the case with the first moving mechanism 501*a*, the second moving mechanism 501*b* fixes the posture of the opposing prism 50 to the main body portion 511*b* in a desired state and moves the main body portion 511*b* such that the opposing prism 50 whose posture is maintained is slidingly moved in the offset direction DD.

The communication shaft portions 502 are members that are configured to have a pair of shaft portions which extend in parallel with each other, and respectively cause the main body portion 511*a* of the first moving mechanism 501*a* and the main body portion 511*b* of the second moving mechanism 501*b* to communicate with each other, and allow the sliding movement in parallel extension directions. Herein, the extension direction of the pair of the communication shaft portions 502 corresponds to the offset direction DD as described above, that is, by the communication shaft portions 502, the light guide prism 10 and the opposing prism 50 can be slidingly moved along the offset direction DD in a state where the faces of the flat plate portion FB1 and the flat plate portion FB2 are arranged on the same plane.

The position sensor 503 is configured to have an optical sensor that detects positions of the light guide prism 10 and the opposing prism 50 by using, for example, reflection of laser light and the like, a pressure sensor that allows pressure which is applied between the light guide prism 10 and the opposing prism 50 to be measured, or the like, and is a sensor that allows the control unit 510 to be informed of an adhesion condition between the light guide prism 10 and the opposing prism 50 by confirming the relative positions of the light guide prism 10 and the opposing prism 50.

In the above description, the bonding ribs 10*n* and 10*p* are references for the fixing of the light guide prism 10 by the first moving mechanism 501*a* and the fixing of the opposing prism 50 by the second moving mechanism 501*b*. In this manner, the relative positions of the light guide prism 10 and the opposing prism 50 are precise.

Further, in the case of the above-described structure, the direction of the sliding movement is the offset direction DD. In this manner, during the adhesion process, the flow of the adhesive is controlled, and the filling of the adhesive can be appropriately performed.

Hereinafter, each of the processes in the manufacturing of the light guide device 20 by using the mounting device 500 will be described. First, the light guide prism 10 and the opposing prism 50 that are molded (molding process) by the molding die 90 or the like which has been described by using FIG. 3 are mounted on the first moving mechanism 501*a* and the second moving mechanism 501*b* of the mounting device 500 and are fixed (preparation process) in a state of being capable of approaching in the offset direction DD and in a state where the first bonding surface AS and the second bonding surface BS oppose each other in a desired posture (preparation process). Then, the adhesive CC is applied (adhesive application process) onto the second bonding surface BS. Herein, an appropriate amount of the adhesive CC is applied to the lower end side of the second bonding surface BS. Then, the drive device 513*a* of the first moving mechanism 501*a* and the drive device 513*b* of the second moving mechanism 501*b* are operated via the control unit 510 to cause the light guide prism 10 and the opposing prism 50 to move in the offset direction DD and approach each other, and both are adhered with each other (adhesion process) while the relative position is confirmed by the position sensor 503. In this case, the adhesive CC is appropriately controlled such that the adhesion area is completely filled therewith. Lastly, the adhesive CC is cured to form the joint JN, the light guide prism 10 and the opposing prism 50 are connected with each other (bonding process), and the light guide device 20 is manufactured. Various methods can be considered with regard to the curing of the adhesive CC. For example, in a case where the adhesive CC is ultraviolet curable resin, the adhesive CC is cured through ultraviolet irradiation in a state where the posture during the adhesion process is maintained by the mounting device 500. In the above description, particularly during the adhesion process, an inclination angle of the first bonding surface AS with respect to the offset direction DD is adjusted, and thus the filling of the adhesive CC can be performed in a desired state even with a relatively simple operation such as the sliding movement (linear movement) in the offset direction DD.

FIG. 6 is a view showing the inclination angle of the first bonding surface AS with respect to the offset direction DD. In this embodiment, the first bonding surface AS that is the bonding site of the light guide prism 10 has a convex surface shape, and the first bonding surface AS is the free-form surface, and thus the inclination angle with respect to the offset direction DD is also different at each position on the first bonding surface AS. Herein, the inclination angle of the offset direction DD with respect to the first bonding surface AS means an angle formed by a directional vector showing the offset direction DD with respect to a plane defining the direction of the first bonding surface AS at each point of the first bonding surface AS, which is, for example, a tangent plane at the point. Particularly, in the state that is shown in the drawing, the first bonding surface AS is convex with regard to a downward direction of the drawing whereas the offset direction is the lateral direction of the drawing. As such, with regard to the inclination angle, an inclination angle alpha of the first bonding surface AS on a downward direction side (one end side) of the drawing is relatively smaller, and an inclination angle gamma on an upward direction side (the other end side) of the drawing is relatively larger. In addition, an inclination angle beta on a middle side of the first bonding surface AS is larger than the inclination angle alpha and is smaller than the inclination angle gamma. In other words, with regard to the angle, alpha<beta<gamma is satisfied. Herein, the inclination angles alpha, beta, and gamma respectively correspond to points P1, P2, and P3 on the first bonding surface AS and, considering tangent planes SQ1, SQ2, and SQ3 that are respectively in contact with the points P1, P2, and P3, are defined with the angle formed by these tangent planes SQ1, SQ2, and SQ3 and the directional vector showing the direction of the offset direction DD. In the case that is shown, a sign of an inner product is the same with regard to a normal vector of the tangent planes SQ1, SQ2, and SQ3 respectively specifying the inclination angles alpha, beta, and gamma and the directional vector showing the offset direction DD. This is referred to as the inclination angles are in the same orientation. In other words, on the first bonding surface AS, the inclination angle is different depending on the position with respect to the offset direction DD, but a state where the inclination angles have the same orientation is maintained. In other words, it does not occur that the inclination angle of the first bonding surface AS is negative and looks downward to the right in the drawing. The second bonding surface BS that is the bonding site on the opposing prism 50 side has a concave surface shape that is substantially the same as the first bonding surface AS, and the inclination angle with respect to the offset direction DD is similar to the case of the first bonding surface AS. The above-described shape allows the clearance between the light guide prism 10 and the opposing prism 50 to be narrow on one end side and to be wide on the other side when the two approach each other from the offset direction DD as already described above using FIG. 2(B).

Hereinafter, the filling of the clearance between the light guide prism 10 and the opposing prism 50 with the adhesive will be more specifically described referring to FIGS. 7A to 7C. FIGS. 7A to 7C are schematic views showing a condition of the adhesive CC from an early stage to a final stage of the adhesion. In a case where the inclination angle is different at each location as described above, a clearance CRa of a part where the inclination angle is relatively small is narrower than a clearance CRb of a part where the inclination angle is of middle size and a clearance CRc of a part where the inclination angle is large. Accordingly, in a case where the adhesive CC is applied to the lower side of the second bonding surface BS, the clearance CRa is filled with the adhesive CC first, then the clearance CRb is filled with the adhesive CC, and lastly the clearance CRc is filled with the adhesive CC as shown in the drawings. In other words, in the drawings, the adhesive CC is directed from a clearance CRa side to a clearance CRc side as in the main direction D1 shown with an arrow, that is, flows to gradually rise from a side with the small inclination angle toward a side with the large inclination angle.

According to the method for manufacturing the light guide device 20 of the above-described first embodiment, the first and second bonding ribs R1 and R2 that constitute the projecting rib 60 which extends along the lateral end portion SP are used such that the light guide prism 10 and the opposing prism 50 approach each other from the specific offset direction DD in a posture-adjusted state and are bonded with each other on the first bonding surface AS and the second bonding surface BS. In this manner, the light guide prism 10 and the opposing prism 50 are connected with each other such that the light guide device 20 is manufactured. During this bonding, a difference in the inclination angles between alpha, beta, and gamma (alpha<beta<gamma) in the offset direction DD with respect to the first bonding surface AS is used such that sizes of the clearances CRa, CRb, and CRc (adhesion areas) which are formed between both of the surfaces AS and BS during the adhesion can be different depending on the positions. Because of the difference between the clearances CRa, CRb, and CRc, the flow direction of the adhesive CC can be controlled with the relatively simple operation of the sliding (linear) movement in the offset direction DD such that a high-accuracy state can be maintained in the joint JN formed from the adhesive CC even in a case where the first bonding surface AS and the second bonding surface BS that have the free-form surfaces which are unlikely to be aligned are adhered to each other. In other words, in the manufacturing of the light guide device 20, the workability of the bonding process is increased and the light guide prism 10 and the opposing prism 50 are allowed to ensure the optical function. In addition, the first bonding surface AS and the second bonding surface BS where the half mirror layer 15 that performs the reflection of the image light while forming the joint JN can be arranged as the free-form surfaces, and the other surfaces that form the appearance of the surfaces contributing to the light guiding such as the first surface S11 and the third surface S13 can be the free-form surfaces, that is, an entire outer diameter can be formed by using the free-form surface, such that light guiding performance can be maintained, the outer shape is similar to a shape of glasses, and a form of the appearance is excellent.

As described above, the values of the inclination angles alpha, beta, and gamma are changed, that is, the difference in the sizes of the clearances CRa, CRb, and CRc is changed by adjusting the direction of the offset direction DD with respect to the first bonding surface AS (or the second bonding surface BS). Accordingly, the adhesive CC can be appropriately controlled as described above by appropriately adjusting the offset direction DD according to, for example, viscosity or the like of the adhesive CC.

In addition, in the above description, the postures are adjusted to be substantially overlapped with regard to the first bonding surface AS and the second bonding surface BS having substantially the same shape, but the posture of the first bonding surface AS and the posture of the second bonding surface BS may be arranged to be slightly shifted and have a slight clearance if this has a degree of not affecting the see-through and the like. For example, in FIG. 2(B), the second bonding surface BS may have a slightly inclined posture such that the area Q1 side is slightly narrow and the area Q2 side is slightly wide.

Also, in the above description, the adhesive CC is applied to the lower end side of the second bonding surface BS in the drawing during the adhesive application process, but is not limited to the application to the lower end side if the filling is sufficiently performed in result and may be applied to a slightly upper side rather than a lower end position. Also, it can be considered that the application is made onto not only the second bonding surface BS but also the first bonding surface AS or both of the bonding surfaces AS and BS. This is similar to the case shown in FIG. 2(E). Also, in an example shown in FIG. 2(D) with regard to the range of application of the adhesive CC, the application is made to the central side on the lower end side. However, the invention is not limited thereto and, for example, the application may be made on not only the central side but also peripheral sides through a line-shaped application on the lower end side.

Also, in the above description, both of the light guide prism 10 and the opposing prism 50 are slidingly moved during the adhesion process, but only one thereof can be slidingly moved with the posture of the other thereof being fixed. In other words, for example, of the first moving mechanism 501a and the second moving mechanism 501b of the mounting device 500, only the first moving mechanism 501a may be slidingly moved without moving the second moving mechanism 501b and only the posture of the opposing prism 50 may be fixed.

Second Embodiment

Hereinafter, the virtual image display apparatus of a second embodiment according to the invention will be described in detail referring to the accompanying drawings.

As shown in FIG. 8, a virtual image display apparatus 100 of this embodiment is a head-mounted display that has an appearance of glasses or the like, and can allow the observer mounted with the virtual image display apparatus 100 to recognize image light by a virtual image and can allow the observer to recognize or observe an outside world image on a see-through basis. The virtual image display apparatus 100 includes first and second optical parts 101a and 101b that cover the front of the eye of the observer in a see-through manner, a frame 102 that supports both of the optical parts 101a and 101b, and first and second image formation main body portions 105a and 105b that are added to parts ranging from both left and right ends of the frame 102 to a rear hanging part (temple) 104. Herein, a first display device 100A on a left side of the drawing, in which the first optical part 101a and the first image formation main body portion 105a are combined with each other, is a part that forms the virtual image for a right eye, and functions as the virtual image display apparatus even unaided. A second display device 100B on a right side of the drawing, in which the second optical part 101b and the second image formation main body portion 105b are combined with each other, is a part that forms the virtual image for a left eye, and functions as the virtual image display apparatus even unaided.

FIGS. 9A and 9B are views comparing the appearance and an inner portion of the virtual image display apparatus 100 with each other, FIG. 9A is an overall view of the virtual image display apparatus 100, and FIG. 9B shows an inner structure of the virtual image display apparatus 100. FIG. 10, which corresponds to a right half of FIG. 9B, is a partially enlarged perspective view of a first display device 100A side of the virtual image display apparatus 100.

As shown in the drawings, the frame 102 that is disposed in the virtual image display apparatus 100 is an elongated and plate-shaped member which is bent into a U shape, and has a front portion 102a extending in a left-right lateral direction (X direction), and a pair of side surface portions 102b and 102c extending in a front-back depth direction (Z direction). The frame 102, that is, the front portion 102a and the side surface portions 102b and 102c are an integrated metallic component formed by aluminum die-casting and of various types of metallic materials. A depth direction (Z direction) width of the front portion 102a is sufficiently larger than a thickness or width of the light guide device 20 corresponding to the first and second optical parts 101a and 101b. The first optical part 101a and the first image formation main body portion 105a are aligned in a lateral end portion 65a of the front portion 102a which is a part ranging from a left end portion to the side surface portion 102b, and are supported by being directly fixed through screwing. The second optical part 101b and the second image formation main body portion 105b are aligned in a lateral end portion 65b of the front portion 102a which is a part ranging from a right end portion to the side surface portion 102c, and are supported by being directly fixed through screwing. The first optical part 101a and the first image formation main body portion 105a are aligned to each other by fitting, and the second optical part 101b and the second image formation main body portion 105b are aligned to each other by fitting.

A protector 108 is fixed to the frame 102 as a under rim-shaped member or a frame-shaped member. A central portion 108g of the protector 108 is fixed to a central portion 102g of the frame 102 by fitting and screwing. Accordingly, as shown in FIG. 9B, a fixing concave portion 102k is formed in the central portion 102g of the frame 102, and a screw hole is formed at a center of the concave portion 102k. The protector 108 is a two-tiered, elongated and plate-shaped member that is bent into a crank shape, and is an integrated component formed of a metallic material or a resin material. A depth direction (Z direction) axis of the protector 108 is approximately equal to the thickness or width of the light guide device 20 corresponding to the first and second optical parts 101a and 101b. A first tip portion 108i of the protector 108 is fixed to the first image formation main body portion 105a by fitting, and a second tip portion 108j of the protector 108 is fixed to the second image formation main body portion 105b by fitting.

The frame 102 not only supports the first and second image formation main body portions 105a and 105b but also serves to protect an inner portion of the first and second image formation main body portions 105a and 105b in conjunction with cover-shaped exterior members 105d that cover the first and second image formation main body portions 105a and 105b. The protector 108 serves to protect a side portion and a lower side portion of the light guide device 20 that are connected to the first and second image formation main body portions 105a and 105b. In other words, if the frame 102 and the protector 108 have sufficient strength, a possibility of damage and misregistration can be reduced in the first and second image formation main body portions 105a and 105b and the first and second optical parts 101a and 101b, particularly, the light guide device 20 that is exposed even in a case of collision or the like between the virtual image display apparatus 100 and another surrounding object.

Pad-shaped nosepiece members 108a are respectively formed in a pair of vertical parts 63a that are close to the central portion 108g of the protector 108. The vertical parts 63a and lateral parts 63b of the protector 108 is separated from or in loose contact with surrounding parts A0 of the light guide device 20 excluding base sides which are connected to the first and second image formation main body portions 105a and 105b. The surrounding part A0 of the light guide device 20 is also separated from or in loose contact with the front portion 102a of the frame 102. In this manner, the light guide device 20 is contiguous to the frame 102 and the protector 108 with the C-shaped surrounding part A0 excluding the base side, but is not fixed to the frame 102 and the protector 108. Accordingly, expansion of the light guide device 20 in a frame-shaped member 109 is allowed and a distortion, deformation, and damage can be prevented in the light guide device 20 even when there is a thermal expansion rate difference between the light guide device 20 at a center and the frame-shaped member 109 which has the frame 102 and the protector 108.

From a different perspective, the first display device 100A has a projection see-through device 70 that is a projection optical system, and an image display device 80 that forms the image light as shown in FIG. 10. The projection see-through device 70 serves to project the image formed by the first image formation main body portion 105a to the eye of the observer as the virtual image. The projection see-through device 70 has the light guide device 20 and the projection lens 30 for imaging.

The light guide device 20 of the projection see-through device 70 is equivalent to the first optical part 101a of FIG. 8, and the projection lens 30 of the projection see-through device 70 and the image display device 80 that forms a display image pattern are equivalent to the first image formation main body portion 105a of FIG. 8. The dripping guide unit 18 (refer to FIG. 1A and the like) that is disposed on the tip side of the opposing prism 50 may be hidden by, for example, a part of the protector 108 or may be cut before assembly onto the frame 102. Accordingly, the dripping guide unit 18 is omitted from the drawing.

The assembly of the first display device 100A onto the frame 102 will be described referring to FIGS. 11A and 11B and the like. The projection lens 30 that constitutes the first image formation main body portion 105a is directly fixed to a first fixing unit 61f which is disposed in the lateral end portion 65a of the frame 102 by using a mounting portion 39g which is formed to be embedded in a tube 39 thereof. During the fixing, a back surface 68f of the first fixing unit 61f and an upper end surface 39f of the mounting portion 39g and the like abut against each other such that alignment is achieved, and a screw 61t is screwed to the mounting portion 39g via a screw hole 61s such that the fixing in a removable manner can be ensured. In this case, a boss 39x that is disposed in the tube 39 is fitted into a boss hole 61x of the frame 102 such that rotation of the tube 39 is regulated and positioning with respect to the rotation is performed. The light guide device 20 that is the first optical part 101a is directly fixed to a second fixing unit 61e which is disposed in the lateral end portion 65a of the frame 102 by using the projection-shaped mounting portion 10g which is formed in a neck portion thereof (equivalent to the link portion BP of FIG. 1A). The mounting portion 10g is disposed upright to expand around from a vicinity of a boundary between the first prism part 11 and the second prism part 12. During the fixing, an abutting surface 68e that is disposed in a front side part of the second fixing unit 61e and a planar part that is a back surface of the mounting portion 10g abut against each other such that alignment is achieved, and a screw 61v is screwed to the mounting portion 10g via a screw hole 61u such that the fixing in a removable manner can be ensured. From a different perspective, the light guide device 20 has the frame mounting rib 10k that has the mounting portion 10g, and thus can be accurately aligned to the frame 102 which is another member of the light guide device 20. The image display device 80 shown in FIG. 10 is fixed to be fitted into a rear end of the tube 39 of the projection lens 30

The light guide device 20 is positioned with respect to the projection lens 30 as the connection portion CP that is a second prism part 12 side tip portion of the light guide prism 10 is fitted into a rectangular frame-shaped and open locking member 39a which is disposed on a front end side of the tube 39 of the projection lens 30. In other words, when the light guide prism 10 that is disposed in the light guide device 20 is fixed to the second fixing unit 61e of the frame 102, the connection portion CP on the second prism part 12 side is inserted into the locking member 39a of the tube 39 to be fitted thereinto. In this case, reference surfaces S21 to S23 of the connection portion CP abut against an inner surface 39m of the locking member 39a such that alignment is achieved. As described above, the image display device 80 that has the image display element and the light guide device 20 are combined with each other via the frame 102 (assembly process).

As shown in FIG. 10B, a groove-shaped limiting unit 102n is disposed as a stopper on a lower surface 102m of the front portion 102a of the frame 102. Of the rib 60 of the light guide prism 10 disposed in the light guide device 20, the projection-shaped bonding rib 10n that is disposed in an upper end portion is inserted into the limiting unit 102n in a loose-fit state with a slight clearance after the assembly of the light guide device 20. In this manner, a displacement on a tip side of the light guide device 20 can be limited with respect to the depth direction (Z direction shown in FIG. 9B) of the frame 102. From a different perspective, the rib 60 limits a relative displacement of the first and second surfaces SS1 and SS2 (refer to FIG. 1A and the like) with respect to the frame 102 during the mounting onto the frame 102. The bonding rib 10n of the light guide device 20 and the limiting unit 102n of the frame 102 extend in the left-right lateral direction (X direction) and the bonding rib 10n and the limiting unit 102n are not in close contact or bonded with each other, and thus a non-fixed state with respect to the frame 102 of the light guide device 20 is ensured. The light guide device 20 is slightly separated from the protector 108, and a non-fixed state is also applied to a relationship with the protector 108. In this manner, the expansion and the like of the light guide device 20 with respect to the frame 102 is allowed even when there is a thermal expansion rate difference between the light guide device 20 and the frame 102.

By the above-described processes, the frame 102 and the projection see-through device 70 can be assembled (refer to FIG. 9B) with each other.

In the above description, the gate portions GP1 and GP2 of the bonding rib 10n of the rib 60 can be hidden from the appearance along with other parts during the assembly of the light guide device 20, and thus an operation such as removal of the gate portions GP1 and GP2 can be simplified.

A function, operation, and the like of the projection see-through device 70 and the like will be described in detail referring to FIG. 12. The first surface S11 of the light guide prism 10 of the projection see-through device 70 is a free-form surface on which an emission side optical axis AXO that is parallel with a Z axis is a central axis, the second surface S12 is a free-form surface on which an optical axis AX1 of a reference surface (cross-section in the drawing) that is parallel with an XZ surface which is inclined with respect to the Z axis is a central axis, and the third surface S13 is a free-form surface on which the emission side optical axis AXO is a central axis. The fourth surface S14 is a free-form surface on which a bisector of a pair of optical axis AX3 and AX4 of the reference surface parallel with the XZ surface that are inclined with respect to the Z axis is a central axis, the fifth surface S15 is a free-form surface on which a bisector of a pair of optical axis AX4 and AX5 of the reference surface parallel with the XZ surface that are inclined with respect to the Z axis is a central axis, and the sixth surface S16 is a free-form surface on which the optical axis AX5 of the reference surface parallel with the XZ surface that is inclined with respect to the Z axis is a central axis. The first to sixth surfaces S11 to S16 have symmetrical shapes with respect to a vertical (or longitudinal) Y axis direction across the reference surface (cross-section in the drawing) that is parallel with the XZ surface extending horizontally (or laterally) and passed by the optical axes AX1 to AX5.

The image display device 80 has an illumination device 81 that emits two-dimensional illumination light SL, an image display element 82 that is a transmission-type spatial light modulation device, and a drive control unit 84 that controls operations of the illumination device 81 and the image display element 82.

The illumination device 81 of the image display device 80 has a light source 81a that generates light of three colors of red, green, and blue, and a backlight light guide unit 81b that diffuses the light from the light source 81a into a rectangular cross-sectional beam. The image display element 82 is formed by, for example, a liquid crystal display device, and spatially modulates the illumination light SL from the illumination device 81 to form image light to be a display target such as a video. The drive control unit 84 has a light source drive circuit 84a, and a liquid crystal drive circuit 84b. The light source drive circuit 84a supplies power to the light source 81a of the illumination device 81 and emits the illumination light SL with stable brightness. The liquid crystal drive circuit 84b outputs an image signal or a drive signal to the image display element 82 and forms color image light or image light which is a base of a moving image or a still image as a transmittance pattern. The liquid crystal drive circuit 84b can have an image processing function, and also an external control circuit can have an image processing function.

Hereinafter, an optical path of the image light GL and the like in the virtual image display apparatus 100 will be described. The image light GL emitted from the image display element 82 is converged by the projection lens 30 and is incident on the sixth surface S16 that is disposed in the light guide prism 10 and has relatively strong positive refractive power.

The image light GL that passes through the sixth surface S16 of the light guide prism 10 proceeds converged, is reflected by the fifth surface S15 that has relatively weak positive refractive power when moving through the second prism part 12, and is reflected by the fourth surface S14 that has relatively weak negative refractive power.

In the first prism part 11, the image light GL that is reflected by the fourth surface S14 of the second prism part 12 is incident on the third surface S13 which has relatively weak positive refractive power and is totally reflected, and is incident on the first surface S11 which has relatively weak negative refractive power and is totally reflected. The image light GL forms an intermediary image in the light guide prism 10 before and after passing through the third surface S13. An image surface II of the intermediary image corresponds to an image surface OI of the image display element 82.

The image light GL that is totally reflected by the first surface S11 is incident on the second surface S12. The image light GL that is incident particularly on the half mirror layer 15 which is the light reflection film RM is partially reflected while partially transmitted through the half mirror layer 15 to be incident on the first surface S11 again and pass therethrough. The half mirror layer 15 acts with relatively strong positive refractive power with respect to the image light GL incident thereon. The first surface S11 acts with negative refractive power with respect to the image light GL that passes therethrough.

The image light GL that passes through the first surface S11 is incident on a pupil of the eye EY of the observer as a substantially parallel beam. In other words, the observer observes the image formed on the image display element 82 by using the image light GL as the virtual image.

Of the external light HL, what is incident further on a −X side than on the second surface S12 of the light guide prism 10 passes through the third surface S13 and the first surface S11 of the first prism part 11, in which case the positive and negative refractive powers are offset and an aberration is corrected. In other words, the observer observes the outside world image with little distortion over the light guide prism 10. Similarly, of the external light HL, what is incident further on a +X side than on the second surface S12 of the light guide prism 10, that is, what is incident on the opposing prism 50 passes through the third transmitting surface S53 and the first transmitting surface S51 while the positive and negative refractive powers are offset and an aberration is corrected. In other words, the observer observes the outside world image with little distortion over the opposing prism 50. Further, of the external light HL, what is incident on the opposing prism 50 that corresponds to the second surface S12 of the light guide prism 10 passes through the third transmitting surface S53 and the first surface S11 while the positive and negative refractive powers are offset and an aberration is corrected. In other words, the observer observes the outside world image with little distortion over the opposing prism 50. The second surface S12 of the light guide prism 10 and the second transmitting surface S52 of the opposing prism 50 have substantially the same curved surface shape along with substantially the same refractive index, and the clearance between both is filled with the joint JN formed by the adhesive CC with substantially the same refractive index. In other words, the second surface 12 of the light guide prism 10 and the second transmitting surface S52 of the opposing prism 50 do not act as a refractive surface with respect to the external light HL.

The external light HL that is incident on the half mirror layer 15 is partially reflected while partially transmitted through the half mirror layer 15, and the external light HL from a direction corresponding to the half mirror layer 15 is weakened to transmittance of the half mirror layer 15. In the meantime, the image light GL is incident from the direction corresponding to the half mirror layer 15, and the observer observes the outside world image along with the image formed in the direction of the half mirror layer 15 on the image display element 82.

Of the image light GL that is propagated in the light guide prism 10 and is incident on the second surface S12, what is not reflected by the half mirror layer 15 is incident into the opposing prism 50, but is prevented from returning to the light guide prism 10 by a not-shown reflection prevention unit disposed in the opposing prism 50. In other words, the image light GL that passes through the second surface S12 is prevented from returning onto the optical path to be stray light. In addition, the external light HL that is incident from the opposing prism 50 side and reflected by the half mirror layer 15 returns to the opposing prism 50, but is prevented from being emitted to the light guide prism 10 by the above-described and not-shown reflection prevention unit disposed in the opposing prism 50. In other words, the external light HL that is reflected by the half mirror layer 15 is prevented from returning onto the optical path to be stray light.

As is apparent from the above description, according to the virtual image display apparatus 100 of this embodiment, the light guide device 20 is directly fixed to the frame 102 with the mounting portion 10g which is one surrounding spot, and thus the fixing of the light guide device 20 is simplified, the virtual image display apparatus 100 is likely to be light in weight, and strength of supporting the light guide device 20 by the frame 102 is improved. Moreover, the surrounding part A0 of the light guide device 20 excluding the mounting portion 10g is in the non-fixed state with respect to the frame 102 and the protector 108, and thus the expansion of the light guide device 20 is allowed with respect to the frame 102 and the like even when there is a thermal expansion rate difference between the light guide device 20 and the frame 102, and the distortion, deformation, and damage can be prevented in the light guide device 20. In this manner, the virtual image display apparatus 100 can be assembled with reliability and high accuracy such that the optical function of the light guide device 20 is ensured. Herein, the light guide device 20 is close in shape to glasses and the form of the appearance is excellent, and thus the entire virtual image display apparatus 100 can have the excellent form.

Also, according to the virtual image display apparatus 100 of this embodiment, the protector 108 covers and protects at least a part of the surrounding part A0 of the light guide device 20 excluding the mounting portion 10g which is fixed to the frame 102. In other words, the frame 102 and the protector 108 can surround, cover, and protect the light guide device 20. In this manner, durability against a strong impact from a random direction, as in the case of dropping the virtual image display apparatus 100, can be increased.

Others

Hereinabove, the embodiments of the invention have been described, but the invention is not limited to the above-described embodiments and various modifications are possible without departing from the scope of the invention. For example, the following modifications are possible.

In the above description, all of the surfaces S11 to S16 of the light guide prism 10 are free-form surfaces but, for example, some thereof may have curved surfaces instead of the free-form surfaces without being limited thereto.

Also, in the above description, the frame 102 and the projection lens 30 are separate bodies and the projection lens 30 is fixed to the frame 102 by screwing. However, the tube 39 of the tube projection lens 30 can be integrally formed with the frame 102. Examples of methods for integrally forming the tube 39 with the frame 102 include cutting out of a tube portion after die-cast integrally molding and outsert molding.

The light guide device 20 or the projection lens 30 can be fixed to the frame 102 by various methods not limited to fastening by screwing.

In the above description, the protector 108 is mounted on the frame 102, but this can be omitted with regard to the protector 108. In this case, an auxiliary member in which the nosepiece member 108a is disposed can be connected to the central portion 102g of the frame 102 while maintaining an original shape of the frame 102 shown in FIG. 9B and the like, or the frame 102 in which an auxiliary member is integrally disposed can be prepared in advance. The auxiliary member can be used as a member that protecting the light guide device 20 as is the case with the vertical parts 63a of the protector 108. Also, the frame 102 and the protector 108 can be integrally manufactured.

In the above description, the light guide device 20 is supported in a cantilever state on the frame 102 side, but the light guide device 20 can be supported from around by the frame 102 and the protector 108. In this case, it is preferable that a member or a mechanism that allows relative expansion and contraction of the light guide device 20 be disposed in the frame 102 and the protector 108.

In the above description, the projection lens 30 is arranged on the light incident side of the light guide prism 10, but the projection lens 30 can be omitted such that the light guide prism 10 itself has an imaging function. Also, another light guide prism 10 that has the imaging function can be arranged instead of the projection lens 30.

In the above description, the limiting unit 102n is disposed in the frame 102 but, instead of this or along with this, a limiting unit that prevents a deformation, blurring or the like of the light guide prism 10 can be disposed in the protector 108.

In the above description, the light guide device 20 and the locking member 39a are disposed in the tube 39 of the projection lens 30, but a locking member that is, for example, fitted into the tube 39 to pinch the tube 39 can be disposed on the light guide device 20 side.

In the above description, the half mirror layer (semi-transmissive reflective film) 15 is formed in the horizontal rectangular area, but an outline of the half mirror layer 15 can be appropriately changed depending on applications and other uses. Also, the transmittance and reflectance of the half mirror layer 15 can be changed depending on applications and other uses.

In the above description, the half mirror layer 15 is a simple semi-transmissive film (for example, the metal reflective film and a dielectric multilayer film), but the half mirror layer 15 can be replaced with a hologram element having a flat or curved surface.

In the above description, display brightness distribution of the image display element 82 is not particularly adjusted but, in a case where there is a brightness difference depending on positions or the like, the display brightness distribution can be adjusted not to be uniform.

In the above description, the image display element 82 that is formed from the transmission-type liquid crystal display device and the like is used as the image display device 80, but various types not limited to the image display element 82 that is formed from the transmission-type liquid crystal display device and the like can be used as the image display device 80. For example, a configuration using a reflection-type liquid crystal display device can be adopted, and a digital micromirror device or the like can be used instead of the image display element 82 formed from the liquid crystal display device and the like. Also, a self-luminous element whose representative examples include an LED array and organic EL (OLED) can be used as the image display device 80

In the above description, the light guide prism 10 and the opposing prism 50 are configured to fully cover the front of the eye EY of the wearer but, not limited thereto, a small-size configuration may be adopted in which, for example, a part that has the curved surfaces-shaped second surface S12 which has the half mirror layer 15 covers only a part of the eye EY, that is, covers a part of the front of the eye, such that a part that is not covered is also present.

In the above description, the virtual image display apparatus 100 that includes the pair of display devices 100A and 100B has been described, but a single display device can also be used. In other words, a configuration in which the projection see-through device 70 and the image display device 80 are disposed with respect to only either one of the right eye or the left eye such that the image is viewed with one eye may be adopted instead of the configuration in which a set of the projection see-through device 70 and the image display device 80 is disposed for each of the right eye and the left eye.

In the above description, the X direction clearance between the pair of display devices 100A and 100B has been described but, the clearance between the display devices 100A and 100B can be adjusted, without being fixed, by a mechanical mechanism and the like. In other words, if an expansion and contraction mechanism or the like is disposed in the frame 102, the X direction clearance between both of the display devices 100A and 100B can be adjusted according to an eye width or the like of the wearer.

In the above description, the image light is totally reflected and introduced by an interface with air without applying a mirror, a half mirror, and the like on the face on the first surface S11 and the third surface S13 of the light guide prism 10 but, with regard to the total reflection in the virtual image display apparatus 100 according to the invention, the reflection can also be made by forming a mirror coat and a half mirror film on a part or whole of the first surface S11 and the third surface S13. For example, there is a case where substantially the entire image light is reflected by applying the mirror coat or the like to the whole or part of the first surface S11 or the third surface S13 after an angle of incident of the image light meets a total reflection condition. Also, if the image light can be obtained with sufficient brightness, the whole or part of the first surface S11 or the third surface S13 may be coated with a mirror which is transmissive to some extent.

In the above description, the light guide prism 10 and the like extends in the lateral direction in which the eye EY is lined up, but the light guide prism 10 can be arranged to extend in a vertical direction. In this case, the light guide prism 10 is supported in a cantilever state in, for example, an upper portion.

In the above description, the image light GL is formed by using the projection lens 30 and the image display device 80 but, instead thereof, a scanning optical system can be used. In other words, the image light can be formed by an MEMS or another scanning unit and an LED or another light source that causes illumination light to be incident on the scanning unit such that the image light is introduced into the light guide prism 10.

REFERENCE SIGNS LIST

AP: eye-front formation portion
A0: surrounding part
AX1 to AX5: optical axe
AXO: emission side optical axis
BP: link portion
CP: connection portion (fitting portion)
CS1 and CS2: connection surfaces
CV: cavity
EC: eye cover unit
EY: eye
F1 and F2: flat plate parts
FB1 and FB2: flat plate portions
GP1 and GP2: gate portions
GL: image light
OI: image surface
PL: parting line
Q1: area
Q2: area
R1: first bonding rib
R2: second bonding rib
RM: light reflection film
RP: polyhedral root portion
S11 to S16: first to sixth surfaces
S21 to S23: reference surfaces
S31 to S33: flat surface parts
S51 to S53: first to third transmitting surfaces
S91 to S95: transfer surfaces
SL: illumination light
SP: lateral end portion
SS1: first face
SS2: second face
TP: tapered surface
10: light guide prism
AS: first bonding surface
10g: mounting portion
10k: frame mounting rib
10n and 10p: bonding ribs
11: first prism part
12: second prism part
15: half mirror layer
18: dripping guide unit
20: light guide device
27: hard coat layer
30: projection lens
39: tube
39a: locking member
39g: mounting portion
50: opposing prism
BS: second bonding surface
60: rib
70: projection see-through device
80: image display device
81: illumination device
82: image display element
84: drive control unit
90: molding die
91 and 92: die
100: virtual image display apparatus
100A: first display device
100B: second display device

The invention claimed is:

1. A method for manufacturing a light guide device including a light guide prism that includes a mirror layer which performs reflection of image light propagated inward on a first bonding surface which is a light guide side bonding surface, an opposing prism that includes a second bonding surface which is arranged to oppose the first bonding surface and is a bonding surface on an opposite side corresponding to the first bonding surface, and is bonded with the light guide prism by bonding the first bonding surface and the second bonding surface with each other across the mirror layer, and a joint that is formed by an adhesive which is filled in an adhesion area between the first bonding surface and the second bonding surface, in which the first bonding surface of the light guide prism is a free-form surface and the second bonding surface of the opposing prism is a free-form surface having substantially the same shape as the first bonding surface, the method comprising:

a preparing step in which the first bonding surface and the second bonding surface are caused to oppose each other, and the light guide prism and the opposing prism are arranged to approach each other in a specific offset direction in which an inclination angle with respect to one end side of the first bonding surface and an inclination angle with respect to the other end side have the same orientation but different sizes;

an adhesive applying step in which the adhesive is applied to at least one surface of the first bonding surface and the second bonding surface that oppose each other in the preparing step;

an adhering step in which the second bonding surface and the first bonding surface are caused to approach each other in the offset direction such that the adhesive applied during the adhesive applying step is interposed so as to be filled between the light guide prism and the opposing prism; and a bonding step in which the adhesive that is filled between the first bonding surface and the second bonding surface during the adhering step is cured such that the joint which bonds the light guide prism and the opposing prism with each other is formed.

2. The method for manufacturing the light guide device according to claim 1, wherein the first bonding surface of the light guide prism has a convex surface shape, wherein the second bonding surface of the opposing prism has a concave surface shape, and wherein the offset direction in the preparing step is a direction in which the inclination angle with respect to the one end side of the first bonding surface is smaller than the inclination angle with respect to the other end side.

3. The method for manufacturing the light guide device according to claim 2, wherein the adhesive in the adhesive applying step is applied to the one end side of the first bonding surface, and wherein the adhesive in the adhering step is caused to flow from a side of the first bonding surface where the inclination angle with respect to the offset direction is small to a side where the inclination angle is large.

4. The method for manufacturing the light guide device according to claim 1, wherein the light guide prism has a projection-shape first bonding rib, wherein the opposing prism has a projection-shaped second bonding rib that corresponds to the first bonding rib, and wherein, in the adhering step, the light guide prism and the opposing prism are adhered with each other through a sliding movement along the offset direction with the first bonding rib and the second bonding rib being references for holding.

5. The method for manufacturing the light guide device according to claim 4, wherein the light guide prism includes first and second faces that are arranged to oppose each other across the first bonding surface, and the free-form surface which introduces the image light from an image display element on an inner surface side while reflecting the light, and wherein the light guide prism includes the first bonding rib in a state of being along at least a part of a lateral end portion disposed out of an area of the first bonding surface of the first and second faces.

6. The method for manufacturing the light guide device according to claim 4, further comprising a molding step in which the light guide prism and the opposing prism are respectively formed by injection molding, wherein, in the molding step, the first bonding rib and the second bonding rib are integrally formed in a state of being respectively along at least a part of the lateral end portion of the light guide prism and a lateral end portion of the opposing prism.

7. The method for manufacturing the light guide device according to claim 6, wherein the first and second bonding ribs respectively have first and second flat plate portions that extend along the lateral end portion, and the first and second flat plate portions are respectively disposed along a parting line of a molding die which performs the injection molding in the molding step to define the offset direction.

8. The method for manufacturing the light guide device according to claim 7, wherein, in the adhering step, the light guide prism and the opposing prism are caused to approach and to be adhered with each other in a state where a surface of the first flat plate portion of the first bonding rib and a surface of the second flat plate portion of the second bonding rib are arranged on the same plane.

9. The method for manufacturing the light guide device according to claim 1, wherein a shape of the free-form surface with regard to the first bonding surface of the light guide prism and the second bonding surface of the opposing prism is determined by performing a parameter adjustment according to control of a flow direction of the adhesive based on the following equation in which x, y, and z are coordinate values in polar coordinates, c is a curvature, $A_{n,m}$ is each coefficient parameter, and $r_0$ is a normalized aperture.

$$z(x, y) = \frac{c(x^2 + y^2)}{1 + \sqrt{1 - c^2(x^2 + y^2)}} + \sum_{n,m} A_{n,m} \left(\frac{x}{r_0}\right)^n \left(\frac{y}{r_0}\right)^m \qquad \text{[Math. 3]}$$

10. The method for manufacturing the light guide device according to claim 1, wherein the light guide prism allows penetration of external light while guiding the image light, and wherein the mirror layer of the light guide prism is a half mirror layer that performs partial reflection of the image light and partial passing of the external light.

11. The method for manufacturing the light guide device according to claim 1, wherein the opposing prism is an auxiliary prism that is bonded with and integrally fixed to the light guide prism and assists in a see-through function of the light guide prism.

12. A light guide device comprising:
a light guide prism that includes a mirror layer which performs reflection of image light propagated inward on a first bonding surface which is a light guide side bonding surface;
an opposing prism that includes a second bonding surface which is arranged to oppose the first bonding surface and is a bonding surface on an opposite side corresponding to the first bonding surface, and is bonded with the light guide prism by bonding the first bonding surface and the second bonding surface with each other across the mirror layer; and
a joint that is formed by an adhesive which is filled in an adhesion area between the first bonding surface and the second bonding surface,
wherein the first bonding surface of the light guide prism is a free-form surface,
wherein the second bonding surface of the opposing prism is a free-form surface having substantially the same shape as the first bonding surface,
wherein the light guide prism has a projection-shaped first bonding rib,
wherein the opposing prism has a projection-shaped second bonding rib that corresponds to the first bonding rib, and
wherein, in the light guide prism and the opposing prism, the first bonding rib and the second bonding rib extend along a specific offset direction in which an inclination angle with respect to one end side of the first bonding surface and an inclination angle with respect to the other end side are different from each other.

13. The light guide device according to claim 12, wherein the first bonding rib and the second bonding rib are respectively integrally formed with the light guide prism and the opposing prism by injection molding in a state of respectively being along at least a part of a lateral end portion of the light guide prism and a lateral end portion of the opposing prism.

14. The light guide device according to claim 13, wherein the first and second bonding ribs respectively have first and second flat plate portions that extend along the lateral end portion, and the first and second flat plate portions are respectively disposed along a parting line of a molding die which performs the injection molding to define the offset direction.

15. The light guide device according to claim 12, wherein a shape of the free-form surface with regard to the first bonding surface of the light guide prism and the second bonding surface of the opposing prism is determined by performing a parameter adjustment according to control of a flow direction of the adhesive based on the following equation in which x, y, and z are coordinate values in polar coordinates, c is a curvature, $A_{n,m}$ is each coefficient parameter, and $r_0$ is a normalized aperture.

$$z(x, y) = \frac{c(x^2 + y^2)}{1 + \sqrt{1 - c^2(x^2 + y^2)}} + \sum_{n,m} A_{n,m} \left(\frac{x}{r_0}\right)^n \left(\frac{y}{r_0}\right)^m \qquad [\text{Math. 4}]$$

16. A virtual image display apparatus comprising:
an image display element that generates image light; and
a light guide device according to claim 12 that introduces image light from the image display element on an inner surface side while reflecting the light.

17. A virtual image display apparatus comprising:
an image display element that generates image light; and
a light guide device according to claim 13 that introduces image light from the image display element on an inner surface side while reflecting the light.

18. A virtual image display apparatus comprising:
an image display element that generates image light; and
a light guide device according to claim 14 that introduces image light from the image display element on an inner surface side while reflecting the light.

19. A virtual image display apparatus comprising:
an image display element that generates image light; and
a light guide device according to claim 15 that introduces image light from the image display element on an inner surface side while reflecting the light.

20. A virtual image display apparatus that allows an observer to recognize an image as a virtual image, comprising:
an image display element that generates image light;
a light guide prism that allows the image to be recognized toward an eye of the observer; and
an opposing prism that includes a mirror layer that reflects light of the image from the light guide prism toward the observer, and constitutes a see-through portion with a bonding surface of the light guide prism across the mirror layer,
wherein, in the light guide prism, the bonding surface of the light guide prism is a free-form surface,
wherein, in the opposing prism, a bonding surface of the opposing prism is a free-form surface having substantially the same shape as the light guide side bonding surface,
wherein the light guide prism has a projection-shaped first bonding rib,
wherein the opposing prism has a projection-shaped second bonding rib that corresponds to the first bonding rib, and
wherein, in the light guide prism and the opposing prism, the first bonding rib and the second bonding rib extend along a specific offset direction in which an inclination angle with respect to one end side of the bonding surface of the light guide prism and an inclination angle with respect to the other end side are different from each other.

* * * * *